United States Patent
Zhang

(10) Patent No.: US 10,506,520 B2
(45) Date of Patent: Dec. 10, 2019

(54) POWER CONTROL METHOD AND APPARATUS

(71) Applicant: HUAWEI TECHNOLOGIES CO., LTD., Shenzhen, Guangdong (CN)

(72) Inventor: Lili Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/301,102

(22) PCT Filed: May 13, 2016

(86) PCT No.: PCT/CN2016/082122
§ 371 (c)(1),
(2) Date: Nov. 13, 2018

(87) PCT Pub. No.: WO2017/193398
PCT Pub. Date: Nov. 16, 2017

(65) Prior Publication Data
US 2019/0191382 A1    Jun. 20, 2019

(51) Int. Cl.
*H04W 52/08* (2009.01)
*H04W 52/14* (2009.01)
(Continued)

(52) U.S. Cl.
CPC ............ *H04W 52/08* (2013.01); *H04L 5/0048* (2013.01); *H04L 5/0051* (2013.01); *H04W 52/14* (2013.01);
(Continued)

(58) Field of Classification Search
CPC ............ H04W 52/146; H04W 52/325; H04W 52/242; H04W 52/34; H04W 52/08; H04W 52/14; H04W 52/143; H04W 8/26
See application file for complete search history.

(56) References Cited

U.S. PATENT DOCUMENTS

2014/0219199 A1  8/2014 Ji et al.
2014/0314014 A1  10/2014 Zhang et al.
(Continued)

FOREIGN PATENT DOCUMENTS

CN  103312484 A  9/2013
CN  103369654 A  10/2013
(Continued)

OTHER PUBLICATIONS

3GPP TS 36.212 V13.1.0 (Mar. 2016),3rd Generation Partnership Project;Technical Specification Group Radio Access Network;Evolved Universal Terrestrial Radio Access (E-UTRA);Multiplexing and channel coding(Release 13),Mar. 2016. total 129 pages.
(Continued)

*Primary Examiner* — Keith Ferguson
(74) *Attorney, Agent, or Firm* — David Roe

(57) ABSTRACT

Embodiments of the present disclosure provide a power control method and apparatus. The method includes: obtaining a power control parameter for a sounding reference signal SRS, where the power control parameter for the SRS includes at least one of a target power parameter value for the SRS, a path loss compensation factor, and a closed-loop power control parameter value for the SRS; and determining transmit power for the SRS on a first carrier based on the power control parameter for the SRS. In this way, the SRS is transmitted at optimal transmit power on a switched-to carrier, ensuring that the SRS is received correctly.

21 Claims, 4 Drawing Sheets

Obtain a power control parameter for a sounding reference signal SRS, where the power control parameter for the SRS includes at least one of a target power parameter value for the SRS, a path loss compensation factor, and a closed-loop power control parameter value for the SRS — 101

Determine transmit power for the SRS on a first carrier based on the power control parameter for the SRS — 102

(51) Int. Cl.
*H04L 5/00* (2006.01)
*H04W 52/24* (2009.01)
*H04W 52/32* (2009.01)
*H04W 72/04* (2009.01)
*H04W 8/26* (2009.01)
*H04W 52/34* (2009.01)

(52) U.S. Cl.
CPC ....... *H04W 52/143* (2013.01); *H04W 52/146* (2013.01); *H04W 52/242* (2013.01); *H04W 52/325* (2013.01); *H04W 72/042* (2013.01); *H04L 5/001* (2013.01); *H04L 5/0098* (2013.01); *H04W 8/26* (2013.01); *H04W 52/34* (2013.01)

(56) References Cited

U.S. PATENT DOCUMENTS

| | | | |
|---|---|---|---|
| 2014/0321406 A1* | 10/2014 | Marinier | H04B 7/024 370/329 |
| 2014/0376471 A1 | 12/2014 | Nishio et al. | |
| 2015/0223213 A1 | 8/2015 | Moon et al. | |
| 2017/0048039 A1 | 2/2017 | Zhao et al. | |
| 2017/0111869 A1 | 4/2017 | Zhang et al. | |
| 2019/0110257 A1 | 4/2019 | Iwai et al. | |
| 2019/0110262 A1 | 4/2019 | Xu et al. | |

FOREIGN PATENT DOCUMENTS

| | | |
|---|---|---|
| CN | 103634887 A | 3/2014 |
| CN | 104081838 A | 10/2014 |
| CN | 104620645 A | 5/2015 |
| CN | 104955144 A | 9/2015 |
| CN | 105099632 A | 11/2015 |
| EP | 2765732 A2 | 8/2014 |
| RU | 2012145853 A | 6/2014 |
| WO | 2017160052 A2 | 9/2017 |

OTHER PUBLICATIONS

3GPP TS 36.213 V13.1.1 (Mar. 2016), 3rd Generation Partnership Project;Technical Specification Group Radio Access Network;Evolved Universal Terrestrial Radio Access (E-UTRA);Physical layer procedures(Release 13), Mar. 2016. total 358 pages.

3GPP TS 36.300 V13.3.0 (Mar. 2016),3rd Generation Partnership Project;Technical Specification Group Radio Access Network;Evolved Universal Terrestrial Radio Access (E-UTRA) and Evolved Universal Terrestrial Radio Access Network (E-UTRAN);Overall description;Stage 2(Release 13), Mar. 2016. total 295 pages.

3GPP TS 36.331 V13.1.0 (Mar. 2016), 3rd Generation Partnership Project;Technical Specification Group Radio Access Network;Evolved Universal Terrestrial Radio Access (E-UTRA);Radio Resource Control (RRC);Protocol specification (Release 13), Mar. 2016. total 551 pages.

XP051080499 R1-163055 Qualcomm Incorporated,"Specification impact of supporting SRS switching",3GPP TSG RAN WG1 Meeting #84bis,Busan, Korea Apr. 11-15, 2016,total 2 pages.

R1-162698 Samsung,"SRS Carrier Switching Aspects",3GPP TSG RAN WG1 #84,Busan, Korea, Apr. 11-15, 2016, total 2 pages.

R1-163614 Huawei et al.,"Way Forward on SRS carrier based switching",3GPP TSG RAN WG1 Meeting #84bis, Busan, Korea, Apr. 11-15, 2016,total 3 pages.

3GPP TS 36.213 V12.9.1 (Mar. 2016),3rd Generation Partnership Project;Technical Specification Group Radio Access Network;Evolved Universal Terrestrial Radio Access (E-UTRA);Physical layer procedures(Release 12),total 241 pages.

* cited by examiner

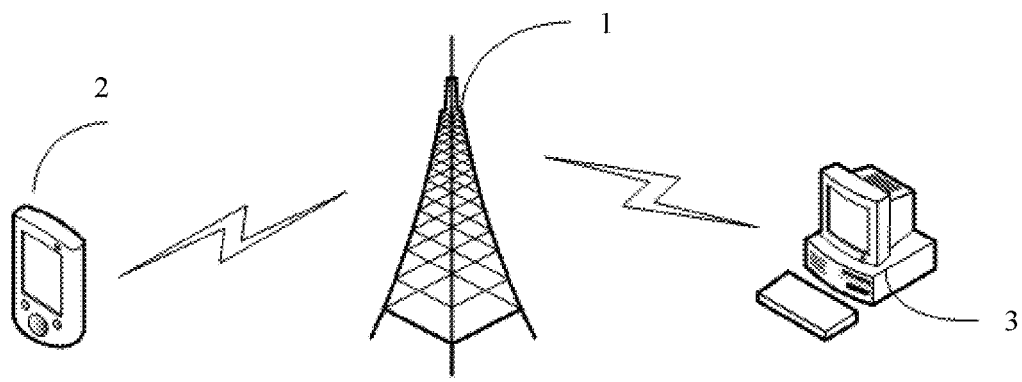

FIG. 1

Obtain a power control parameter for a sounding reference signal SRS, where the power control parameter for the SRS includes at least one of a target power parameter value for the SRS, a path loss compensation factor, and a closed-loop power control parameter value for the SRS — 101

Determine transmit power for the SRS on a first carrier based on the power control parameter for the SRS — 102

FIG. 2

POWER CONTROL METHOD AND APPARATUS

CROSS-REFERENCE TO RELATED APPLICATIONS

This application is a national stage of International Application No. PCT/CN2016/082122, filed on May 13, 2016, which is hereby incorporated by reference in its entirety as if reproduced in full.

TECHNICAL FIELD

Embodiments of the present disclosure relate to communications technologies, and in particular, to a power control method and apparatus.

BACKGROUND

In order to increase system transmission bandwidth, a carrier aggregation technology is introduced into a Long Term Evolution Advanced (Long Term Evolution-Advance, LTE-A for short) system.

During carrier aggregation, user equipment (User Equipment, UE for short) usually can aggregate a larger quantity of downlink carriers, while a much smaller quantity of uplink carriers. Generally, based on channel non-reciprocity, for measurement of some downlink channels, measurement of the downlink channel is obtained by using a channel non-reciprocity feature, for example, a precoding matrix index (precoding matrix index, PMI for short) and an uplink sounding reference signal (Sounding Reference Symbol, SRS for short). Because UE's downlink carrier aggregation capacity is greater than its uplink carrier aggregation capacity, no uplink transmission is present on some time division duplex (time division duplex, TDD for short) carriers for downlink transmission of the UE. To ensure timely SRS transmission, carrier switching is required. For example, in a first subframe, a carrier 1 and a carrier 2 are used for downlink transmission. When SRS transmission is required in a second subframe, carrier switching is performed. The carrier 2 is changed to a carrier 3 and the carrier 3 is used to transmit the SRS. In addition, transmit power for the SRS needs to be controlled to ensure that the SRS is received correctly.

Parameter setting of a prior-art SRS power control solution depends on some parameters related to physical uplink shared channel (Physical Uplink Shared Channel, PUSCH for short) power control, while the UE cannot obtain the parameters related to PUSCH power control on the switched-to carrier used for SRS transmission. As a result, SRS power control is not possible, and the SRS cannot be received correctly.

SUMMARY

Embodiments of the present disclosure provide a power control method and apparatus, so that an SRS is transmitted at optimal transmit power on a switched-to carrier, ensuring that the SRS is received correctly.

According to a first aspect, an embodiment of the present disclosure provides a power control method, including: obtaining a power control parameter for a sounding reference signal SRS, where the power control parameter for the SRS includes at least one of a target power parameter value for the SRS, a path loss compensation factor, and a closed-loop power control parameter value for the SRS; and determining transmit power for the SRS on a first carrier based on the power control parameter for the SRS. UE can calculate the transmit power for the SRS on the first carrier based on a newly configured power control parameter for the SRS, so that the SRS is transmitted at optimal transmit power on a switched-to carrier, ensuring that the SRS is received correctly.

In a possible design, the first carrier is a carrier on which no physical uplink shared channel PUSCH is sent.

In a possible design, the obtaining a power control parameter for a sounding reference signal SRS includes: receiving power control signaling or cross-carrier power control signaling sent by a base station.

In a possible design, the power control signaling includes open-loop power control signaling and/or closed-loop power control signaling.

In a possible design, the obtaining a power control parameter for a sounding reference signal SRS includes: obtaining the power control parameter for the SRS from the power control signaling or the cross-carrier power control signaling.

In a possible design, the power control signaling or the cross-carrier power control signaling includes radio resource control RRC signalling or physical layer signalling.

With the foregoing possible designs, the UE can obtain the power control parameter for the SRS in different manners. The manner of obtaining the power control parameter for the SRS is flexible and features ease of operation.

In a possible design, the target power parameter value for the SRS is a parameter value obtained based on a preamble initial received target power value; or the target power parameter value for the SRS is a parameter value obtained based on the preamble initial received target power value and a power adjustment value.

In a possible design, the obtaining the power control parameter from the power control signaling or the cross-carrier power control signaling includes: parsing out the power control parameter for the SRS from the power control signaling or the cross-carrier power control signaling based on a first radio network temporary identifier RNTI.

In a possible design, the determining transmit power for the SRS based on the power control parameter for the SRS includes: obtaining the transmit power for the SRS based on at least one of maximum transmit power of user equipment UE, a transmit power adjustment value for the SRS, transmission bandwidth for the SRS, the target power parameter value for the SRS, the path loss compensation factor, and an estimated downlink path loss value.

In a possible design, the determining transmit power for the SRS based on the power control parameter for the SRS includes: calculating the transmit power $P_{SRS,c1}(i)$ for the SRS according to a formula $P_{SRS,c1}(i) = \min\{P_{CMAX,c1}(i), P_{SRS\_OFFSET,c1}(m) + 10 \log_{10}(M_{SRS,c1}) + P_{O\_SRS,c1}(j) + \alpha_{SRS,c1}(j) \cdot PL_{SRS,c1}\}$, where $P_{CMAX,c1}(i)$ is maximum transmit power of the user equipment UE in an $i^{th}$ subframe; $P_{SRS\_OFFSET,c1}(m)$ is the transmit power adjustment value for the SRS, where m equals 0 or 1, $M_{SRS,c1}$ is the transmission bandwidth for the SRS; $P_{O\_SRS,c1}(j)$ is the target power parameter value for the SRS, where j equals 0, 1, or 2; $\alpha_{SRS,c1}(j)$ is the path loss compensation factor; and $PL_{SRS,c1}$ is the estimated downlink path loss value.

With the foregoing possible implementations, the UE can calculate the transmit power for the SRS accurately, so as to ensure SRS transmission quality.

In a possible design, before the determining transmit power for the SRS based on the power control parameter for the SRS, the method further includes: determining whether the SRS is configured periodically or configured aperiodically.

In a possible design, if the power control parameter for the SRS includes the closed-loop power control parameter value for the SRS, the closed-loop power control parameter value for the SRS is an absolute value or a relative adjustment value.

In a possible design, before the obtaining the power control parameter for the SRS, the method further includes: obtaining transmission power control TPC information, where the TPC information is information scrambled with the first radio network temporary identifier RNTI.

In a possible design, the obtaining the power control parameter for the SRS includes: parsing out the closed-loop power control parameter value for the SRS from the TPC information based on the first RNTI.

In a possible design, if the power control parameter for the SRS includes the closed-loop power control parameter value for the SRS, before the obtaining the power control parameter for the SRS, the method further includes: obtaining downlink control information DCI.

In a possible design, the obtaining the power control parameter for the SRS includes: obtaining the closed-loop power control parameter value for the SRS based on the DCI.

In a possible design, if the DCI is control information obtained on a second carrier, the DCI includes at least a first carrier index.

In a possible design, the second carrier is a switching-from carrier or any carrier other than a switched-to carrier, and the first carrier is the switched-to carrier.

In a possible design, the obtaining the closed-loop power control parameter value for the SRS based on the DCI includes: obtaining the closed-loop power control parameter value for the SRS on a carrier corresponding to the first carrier index.

In a possible design, if the DCI is control information obtained on the first carrier, the obtaining the closed-loop power control parameter value for the SRS based on the DCI includes: obtaining the closed-loop power control parameter value for the SRS from the DCI.

With the foregoing possible designs, the UE can obtain the closed-loop power control parameter value for the SRS in different manners. In addition, a new DCI format is defined, so that the UE can obtain a complete power control parameter for the SRS, to ensure SRS transmission reliability.

In a possible design, if the closed-loop power control parameter value for the SRS is a relative adjustment value, the method further includes: determining the closed-loop power control parameter value for the SRS based on at least one of closed-loop power control information or a relative adjustment value for an SRS in a previous subframe.

In a possible design, the determining the closed-loop power control parameter value for the SRS based on at least one of closed-loop power control information or a relative adjustment value for an SRS in a previous subframe includes: calculating the closed-loop power control parameter value $f_{SRS,c1}(i)$ for the SRS according to a formula $f_{SRS,c1}(i)=f_{SRS,c1}(i-1)+\delta_{SRS,c1}(i-K_{SRS})$, where $f_{SRS,c1}(i-1)$ is the closed-loop power control information for the SRS in the previous subframe; $\delta_{SRS,c1}(i-K_{SRS})$ is the relative adjustment value; and if the SRS is configured periodically, $K_{SRS}$ is a subframe periodicity of the SRS, or if the SRS is configured aperiodically, $i-K_{SRS}$ is a subframe number of the previous subframe.

In a possible design, the determining transmit power for the SRS based on the power control parameter for the SRS includes: obtaining the transmit power for the SRS based on at least one of maximum transmit power of the user equipment UE, a transmit power adjustment value for the SRS, transmission bandwidth for the SRS, the target power parameter value for the SRS, the path loss compensation factor, an estimated downlink path loss value, and the closed-loop power control parameter for the SRS.

In a possible design, the determining transmit power for the SRS based on the power control parameter for the SRS includes: calculating the transmit power $P_{SRS,c1}(i)$ for the SRS according to a formula $P_{SRS,c1}(i)=\min\{P_{CMAX,c1}(i), P_{SRS\_OFFSET,c1}(m)+10\ \log_{10}(M_{SRS,c1})+P_{O\_SRS,c1}(j)+\alpha_{SRS,c1}(j)\cdot PL_{SRS,c1}+f_{SRS,c1}(i)\}$, where $P_{CMAX,c1}(i)$ is maximum transmit power of the user equipment UE in an $i^{th}$ subframe; $P_{SRS\_OFFSET,c1}(m)$ is the transmit power adjustment value for the SRS, where m equals 0 or 1; $M_{SRS,c1}$ is the transmission bandwidth for the SRS; $P_{O\_SRS,c1}(j)$ is the target power parameter value for the SRS; $\alpha_{SRS,c1}(j)$ is the path loss compensation factor; $PL_{SRS,c1}$ is the estimated downlink path loss value; and $f_{SRS,c1}(i)$ is the closed-loop power control parameter value for the SRS.

With the foregoing possible designs, the UE can calculate the transmit power for the SRS in a closed-loop circumstance accurately, so as to ensure that the SRS can be received correctly in different circumstances.

According to a second aspect, an embodiment of the present disclosure provides a power control method, including: obtaining transmit power in a symbol overlapping portion of a first subframe and a second subframe, where the first subframe is a subframe in which a sounding reference signal SRS is transmitted on a first carrier, and the second subframe is a subframe in which an SRS or a physical channel is transmitted on a second carrier; and if the transmit power is greater than maximum transmit power of user equipment UE, controlling transmit power for a to-be-transmitted signal, where the to-be-transmitted signal includes the SRS and/or the physical channel.

In a possible design, before the controlling transmit power for a to-be-transmitted signal, the method further includes: determining whether the SRS is configured periodically or configured aperiodically.

In a possible design, the controlling transmit power for a to-be-transmitted signal includes: controlling the transmit power for the to-be-transmitted signal based on a periodical configuration of the SRS; or controlling the transmit power for the to-be-transmitted signal based on an aperiodical configuration of the SRS.

In a possible design, if the SRS is configured periodically, the controlling transmit power for a to-be-transmitted signal includes: dropping the SRS or performing power scaling for the SRS.

In a possible design, if the SRS is configured aperiodically, the physical channel is a physical uplink shared channel PUSCH, and the PUSCH does not include uplink control information UCI, the controlling transmit power for a to-be-transmitted signal includes: dropping the PUSCH or performing power scaling for the PUSCH.

In a possible design, if the SRS is configured aperiodically, the physical channel is a physical uplink shared channel PUSCH, and the PUSCH includes uplink control information UCI, the controlling transmit power for a to-be-transmitted signal includes: dropping the SRS or performing power scaling for the SRS.

In a possible design, if the SRS is configured aperiodically, and the physical channel is a physical uplink control channel PUCCH, the controlling transmit power for a to-be-transmitted signal includes: dropping the SRS or performing power scaling for the SRS; or dropping the PUCCH or performing power scaling for the PUCCH.

In a possible design, if the SRS is configured aperiodically, the physical channel is a physical uplink control channel PUCCH, and the PUCCH includes a hybrid automatic repeat request HARQ, the controlling transmit power for a to-be-transmitted signal includes: dropping the SRS or performing power scaling for the SRS.

In a possible design, if the SRS is configured aperiodically, the physical channel is a physical uplink control channel PUCCH, and the PUCCH includes only channel state information CSI, the controlling transmit power for a to-be-transmitted signal includes: dropping the SRS or performing power scaling for the SRS; or dropping the PUCCH or performing power scaling for the PUCCH.

In a possible design, if the SRS is configured aperiodically, the physical channel is a packet random access channel PRACH, and the PRACH is concurrent, the controlling transmit power for a to-be-transmitted signal includes: dropping the SRS or performing power scaling for the SRS.

An implementation principle and a beneficial effect of the power control method provided in this embodiment are similar to those of the first aspect, and details are not described herein again.

According to a third aspect, an embodiment of the present disclosure provides a power control method, where the method includes: obtaining a power control parameter for a sounding reference signal SRS on a first carrier, where the power control parameter for the SRS includes at least one of a target power parameter value for the SRS, a path loss compensation factor, and a closed-loop power control parameter value for the SRS; and sending the power control parameter for the SRS to user equipment UE, so that the UE determines transmit power for the SRS on the first carrier based on the power control parameter for the SRS.

In a possible design, the first carrier is a carrier on which no physical uplink shared channel PUSCH is sent.

In a possible design, the sending the power control parameter for the SRS to user equipment UE includes: sending the power control parameter for the SRS to the UE by using power control signaling or cross-carrier power control signaling.

In a possible design, the power control signaling includes open-loop power control signaling and/or closed-loop power control signaling.

In a possible design, the power control signaling or the cross-carrier power control signaling includes radio resource control RRC signaling or physical layer signaling.

In a possible design, the target power parameter value for the SRS is a parameter value obtained based on a preamble initial received target power value; or the target power parameter value for the SRS is a parameter value obtained based on the preamble initial received target power value and a power adjustment value.

In a possible design, the sending the power control parameter for the SRS to the UE by using power control signaling or cross-carrier power control signaling includes: scrambling the power control parameter for the SRS based on a first radio network temporary identifier RNTI, to generate the power control signaling or the cross-carrier power control signaling; and sending the power control signaling or the cross-carrier power control signaling to the UE.

In a possible design, the SRS is configured periodically or configured aperiodically.

In a possible design, if the power control parameter for the SRS includes the closed-loop power control parameter value for the SRS, the closed-loop power control parameter value for the SRS is an absolute value or a relative adjustment value.

In a possible design, the method further includes: sending transmission power control TPC information to the UE, so that the UE parses out the closed-loop power control parameter value for the SRS from the TPC information, where the TPC information is information scrambled with the first radio network temporary identifier RNTI.

In a possible design, if the power control parameter for the SRS includes the closed-loop power control parameter for the SRS, the method further includes: sending downlink control information DCI to the UE, so that the UE obtains the closed-loop power control parameter value for the SRS based on the DCI.

In a possible design, if the DCI is control information obtained on a second carrier, the DCI includes at least a first carrier index, and the DCI is used to instruct the UE to obtain the closed-loop power control parameter value for the SRS on a carrier corresponding to the first carrier index.

In a possible design, the second carrier is a switching-from carrier or any carrier other than a switched-to carrier, and the first carrier is the switched-to carrier.

In a possible design, if the DCI is control information obtained on the first carrier, the DCI is used to instruct the UE to obtain the closed-loop power control parameter value for the SRS from the DCI.

An implementation principle and a beneficial effect of the power control method provided in this embodiment are similar to those of the first aspect, and details are not described herein again.

According to a fourth aspect, an embodiment of the present disclosure provides a power control apparatus, including: an obtaining module, configured to obtain a power control parameter for a sounding reference signal SRS, where the power control parameter for the SRS includes at least one of a target power parameter value for the SRS, a path loss compensation factor, and a closed-loop power control parameter value for the SRS; and a determining module, configured to determine transmit power for the SRS on a first carrier based on the power control parameter for the SRS.

In a possible design, the first carrier is a carrier on which no physical uplink shared channel PUSCH is sent.

In a possible design, the obtaining module is specifically configured to receive power control signaling or cross-carrier power control signaling sent by a base station.

In a possible design, the power control signaling includes open-loop power control signaling and/or closed-loop power control signaling.

In a possible design, the obtaining module is specifically further configured to obtain the power control parameter for the SRS from the power control signaling or the cross-carrier power control signaling.

In a possible design, the power control signaling or the cross-carrier power control signaling includes radio resource control RRC signaling or physical layer signaling.

In a possible design, the target power parameter value for the SRS is a parameter value obtained based on a preamble initial received target power value; or the target power parameter value for the SRS is a parameter value obtained based on the preamble initial received target power value and a power adjustment value.

In a possible design, that the obtaining module obtains the power control parameter from the power control signaling or the cross-carrier power control signaling includes: the obtaining module parses out the power control parameter for the SRS from the power control signalling or the cross-carrier power control signalling based on a first radio network temporary identifier RNTI.

In a possible design, the determining module is specifically configured to obtain the transmit power for the SRS based on at least one of maximum transmit power of user equipment UE, a transmit power adjustment value for the SRS, transmission bandwidth for the SRS, the target power parameter value for the SRS, the path loss compensation factor, and an estimated downlink path loss value.

In a possible design, the determining module is specifically configured to calculate the transmit power $P_{SRS,c1}(i)$ for the SRS according to a formula $P_{SRS,c1}(i)=\min\{P_{CMAX,c1}(i), P_{SRS\_OFFSET,c1}(m)+10\ \log_{10}(M_{SRS,c1})+P_{O\_SRS,c1}(j)+\alpha_{SRS,c1}(j)\cdot PL_{SRS,c1}\}$, where $P_{CMAX,c1}(i)$ is maximum transmit power of the user equipment UE in an $i^{th}$ subframe; $P_{SRS\_OFFSET,c1}(m)$ is the transmit power adjustment value for the SRS, where m equals 0 or 1; $M_{SRS,c1}$ is the transmission bandwidth for the SRS; $P_{O\_SRS,c1}(j)$ is the target power parameter value for the SRS, where j equals 0, 1, or 2; $\alpha_{SRS,c1}(j)$ is the path loss compensation factor; and $PL_{SRS,c1}$ is the estimated downlink path loss value.

In a possible design, the determining module is further configured to determine whether the SRS is configured periodically or configured aperiodically.

In a possible design, if the power control parameter for the SRS includes the closed-loop power control parameter value for the SRS, the closed-loop power control parameter value for the SRS is an absolute value or a relative adjustment value.

In a possible design, the obtaining module is further configured to obtain transmission power control TPC information, where the TPC information is information scrambled with the first radio network temporary identifier RNTI.

In a possible design, that the obtaining module obtains the power control parameter for the SRS includes: the obtaining module parses out the closed-loop power control parameter value for the SRS from the TPC information based on the first RNTI.

In a possible design, if the power control parameter for the SRS includes the closed-loop power control parameter value for the SRS, the obtaining module is further configured to obtain downlink control information DCI.

In a possible design, that the obtaining module obtains the power control parameter for the SRS includes: the obtaining module obtains the closed-loop power control parameter value for the SRS based on the DCI.

In a possible design, if the DCI is control information obtained on a second carrier, the DCI includes at least a first carrier index.

In a possible design, the second carrier is a switching-from carrier or any carrier other than a switched-to carrier, and the first carrier is the switched-to carrier.

In a possible design, that the obtaining module obtains the closed-loop power control parameter value for the SRS based on the DCI includes: the obtaining module obtains the closed-loop power control parameter value for the SRS on a carrier corresponding to the first carrier index.

In a possible design, if the DCI is control information obtained on the first carrier, that the obtaining module obtains the closed-loop power control parameter value for the SRS based on the DCI includes: the obtaining module obtains the closed-loop power control parameter value for the SRS from the DCI.

In a possible design, if the closed-loop power control parameter value for the SRS is a relative adjustment value, the determining module is further configured to determine the closed-loop power control parameter value for the SRS based on at least one of closed-loop power control information or a relative adjustment value for an SRS in a previous subframe.

In a possible design, that the determining module determines the closed-loop power control parameter for the SRS based on at least one of closed-loop power control information or a relative adjustment value for an SRS in a previous subframe includes: the determining module calculates the closed-loop power control parameter value $f_{SRS,c1}(i)$ for the SRS according to a formula $f_{SRS,c1}(i)=f_{SRS,c1}(i-1)+\delta_{SRS,c1}(i-K_{SRS})$, where $f_{SRS,c1}(i-1)$ is the closed-loop power control information for the SRS in the previous subframe; $\delta_{SRS,c1}(i-K_{SRS})$ is the relative adjustment value; and if the SRS is configured periodically, $K_{SRS}$ is a subframe periodicity of the SRS, or if the SRS is configured aperiodically, $i-K_{SRS}$ is a subframe number of the previous subframe.

In a possible design, that the determining module determines transmit power for the SRS based on the power control parameter for the SRS includes: the determining module obtains the transmit power for the SRS based on at least one of maximum transmit power of the user equipment UE, a transmit power adjustment value for the SRS, transmission bandwidth for the SRS, the target power parameter value for the SRS, the path loss compensation factor, the estimated downlink path loss value, and a closed-loop power control parameter for the SRS.

In a possible design, that the determining module determines transmit power for the SRS based on the power control parameter for the SRS includes: the determining module calculates the transmit power $P_{SRS,c1}(i)$ for the SRS according to a formula $P_{SRS,c1}(i)=\min\{P_{CMAX,c1}(i), P_{SRS\_OFFSET,c1}(m)+10\ \log_{10}(M_{SRS,c1})+P_{O\_SRS,c1}(j)+\alpha_{SRS,c1}(j)\cdot PL_{SRS,c1}+f_{SRS,c1}(i)\}$, where $P_{CMAX,c1}(i)$ is maximum transmit power of the user equipment UE in an $i^{th}$ subframe; $P_{SRS\_OFFSET,c1}(m)$ is the transmit power adjustment value for the SRS, where m equals 0 or 1; $M_{SRS,c1}$ is the transmission bandwidth for the SRS; $P_{O\_SRS,c1}(j)$ is the target power parameter value for the SRS; $\alpha_{SRS,c1}(j)$ is the path loss compensation factor; $PL_{SRS,c1}$ is the estimated downlink path loss value; and $f_{SRS,c1}(i)$ is the closed-loop power control parameter value for the SRS.

An implementation principle and a beneficial effect of the power control apparatus provided in this embodiment are similar to those of the first aspect, and details are not described herein again.

According to a fifth aspect, an embodiment of the present disclosure provides a power control apparatus, including: an obtaining module, configured to obtain transmit power in a symbol overlapping portion of a first subframe and a second subframe, where the first subframe is a subframe in which a sounding reference signal SRS is transmitted on a first carrier, and the second subframe is a subframe in which an SRS or a physical channel is transmitted on a second carrier; and a processing module, configured to, if the transmit power is greater than maximum transmit power of user equipment UE, control transmit power for a to-be-transmitted signal, where the to-be-transmitted signal includes the SRS and/or the physical channel.

In a possible design, the processing module is further configured to determine whether the SRS is configured periodically or configured aperiodically.

In a possible design, that the processing module controls transmit power for a to-be-transmitted signal includes: the processing module controls the transmit power for the to-be-transmitted signal based on a periodical configuration of the SRS; or the processing module controls the transmit power for the to-be-transmitted signal based on an aperiodical configuration of the SRS.

In a possible design, if the SRS is configured periodically, that the processing module controls transmit power for a to-be-transmitted signal includes: the processing module drops the SRS or performs power scaling for the SRS.

In a possible design, if the SRS is configured aperiodically, the physical channel is a physical uplink shared channel PUSCH, and the PUSCH does not include uplink control information UCI, that the processing module controls transmit power for a to-be-transmitted signal includes: the processing module drops the PUSCH or performs power scaling for the PUSCH.

In a possible design, if the SRS is configured aperiodically, the physical channel is a physical uplink shared channel PUSCH, and the PUSCH includes uplink control information UCI, that the processing module controls transmit power for a to-be-transmitted signal includes: the processing module drops the SRS or performs power scaling for the SRS.

In a possible design, if the SRS is configured aperiodically, the physical channel is a physical uplink control channel PUCCH, that the processing module controls transmit power for a to-be-transmitted signal includes: the processing module drops the SRS or performs power scaling for the SRS; or the processing module drops the PUCCH or performs power scaling for the PUCCH.

In a possible design, if the SRS is configured aperiodically, the physical channel is a physical uplink control channel PUCCH, and the PUCCH includes a hybrid automatic repeat request HARQ, that the processing module controls transmit power for a to-be-transmitted signal includes: the processing module drops the SRS or performs power scaling for the SRS.

In a possible design, if the SRS is configured aperiodically, the physical channel is a physical uplink control channel PUCCH, and the PUCCH includes only channel state information CSI, that the processing module controls transmit power for a to-be-transmitted signal includes: the processing module drops the SRS or performs power scaling for the SRS; or the processing module drops the PUCCH or performs power scaling for the PUCCH.

In a possible design, if the SRS is configured aperiodically, the physical channel is a packet random access channel PRACH, and the PRACH is concurrent, that the processing module controls transmit power for a to-be-transmitted signal includes: the processing module drops the SRS or performs power scaling for the SRS.

An implementation principle and a beneficial effect of the power control apparatus provided in this embodiment are similar to those of the first aspect, and details are not described herein again.

According to a sixth aspect, an embodiment of the present disclosure provides a power control apparatus, including: an obtaining module, configured to obtain a power control parameter for a sounding reference signal SRS on a first carrier, where the power control parameter for the SRS includes at least one of a target power parameter value for the SRS, a path loss compensation factor, and a closed-loop power control parameter value for the SRS; and a sending module, configured to send the power control parameter for the SRS to user equipment UE, so that the UE determines transmit power for the SRS on the first carrier based on the power control parameter for the SRS.

In a possible design, the first carrier is a carrier on which no physical uplink shared channel PUSCH is sent.

In a possible design, the sending module is specifically configured to send the power control parameter for the SRS to the UE by using power control signaling or cross-carrier power control signaling.

In a possible design, the power control signaling includes open-loop power control signaling and/or closed-loop power control signaling.

In a possible design, the power control signaling or the cross-carrier power control signaling includes radio resource control RRC signaling or physical layer signaling.

In a possible design, the target power parameter value for the SRS is a parameter value obtained based on a preamble initial received target power value; or the target power parameter value for the SRS is a parameter value obtained based on the preamble initial received target power value and a power adjustment value.

In a possible design, that the sending module sends the power control parameter for the SRS to the UE by using power control signaling or cross-carrier power control signaling includes: the sending module scrambles the power control parameter for the SRS based on a first radio network temporary identifier RNTI, to generate the power control signaling or the cross-carrier power control signaling; and sends the power control signaling or the cross-carrier power control signaling to the UE.

In a possible design, the SRS is configured periodically or configured aperiodically.

In a possible design, if the power control parameter for the SRS includes the closed-loop power control parameter value for the SRS, the closed-loop power control parameter value for the SRS is an absolute value or a relative adjustment value.

In a possible design, the sending module is further configured to send transmission power control TPC information to the UE, so that the UE parses out the closed-loop power control parameter value for the SRS from the TPC information, where the TPC information is information scrambled with the first radio network temporary identifier RNTI.

In a possible design, if the power control parameter for the SRS includes the closed-loop power control parameter value for the SRS, the sending module is further configured to send downlink control information DCI to the UE, so that the UE obtains the closed-loop power control parameter value for the SRS based on the DCI.

In a possible design, if the DCI is control information obtained on a second carrier, the DCI includes at least a first carrier index, and the DCI is used to instruct the UE to obtain the closed-loop power control parameter value for the SRS on a carrier corresponding to the first carrier index.

In a possible design, the second carrier is a switching-from carrier or any carrier other than a switched-to carrier, and the first carrier is the switched-to carrier.

In a possible design, if the DCI is control information obtained on the first carrier, the DCI is used to instruct the UE to obtain the closed-loop power control parameter value for the SRS from the DCI.

An implementation principle and a beneficial effect of the power control apparatus provided in this embodiment are similar to those of the first aspect, and details are not described herein again.

BRIEF DESCRIPTION OF DRAWINGS

To describe the technical solutions in the embodiments of the present disclosure or in the prior art more clearly, the following briefly describes the accompanying drawings required for describing the embodiments or the prior art. Apparently, the accompanying drawings in the following description show some embodiments of the present disclosure, and persons of ordinary skill in the art may still derive other drawings from these accompanying drawings without creative efforts.

FIG. 1 is a schematic diagram of an application scenario of a power control method according to an embodiment of the present disclosure;

FIG. 2 is a flowchart of a power control method according to Embodiment 1 of the present disclosure;

DESCRIPTION OF EMBODIMENTS

Figure 3:
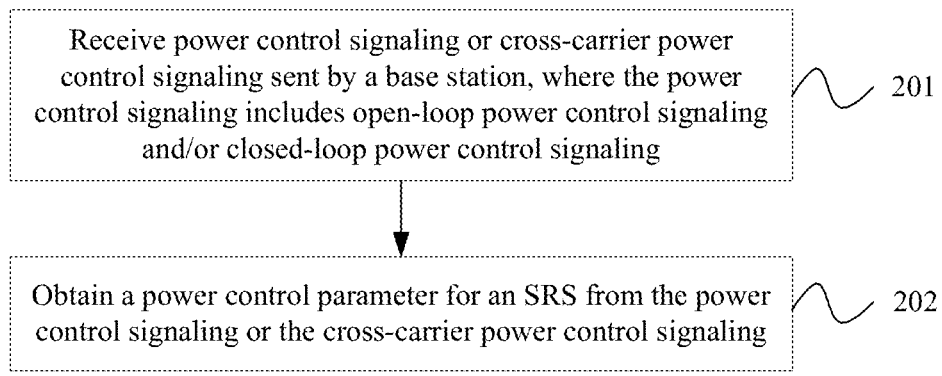
FIG. 3 is a flowchart of a power control method according to Embodiment 2 of the present disclosure.

FIG. 1 is a schematic diagram of an application scenario of a power control method according to an embodiment of the present disclosure. The method is applied to a wireless communications system, for example, an LTE-A system. As shown in FIG. 1, the scenario includes a network device 1, a user terminal 2, and a user terminal 3. The power control method provided in this application is mainly used for data transmission between the network device and the user terminal. It should be noted that the scenario may further include other network devices and other user terminals. FIG. 1 is merely an example for description and imposes no limitation.

The user terminal used in this embodiment of the present disclosure may be a device that provides voice and/or data connectivity for a user, a handheld device with a wireless connection function, or another processing device connected to a wireless modem. A wireless terminal may communicate with one or more core networks through a radio access network (Radio Access Network, RAN for short). The wireless terminal may be a mobile terminal, such as a mobile phone (also referred to as a "cellular" phone) or a computer provided with a mobile terminal, and for example, may be a portable mobile apparatus, a pocket-sized mobile apparatus, a handheld mobile apparatus, a computer built-in mobile apparatus, or an in-vehicle mobile apparatus, which exchanges voice and/or data with the radio access network.

The network device used in this embodiment of the present disclosure may be a base station, an access point, or a device in communication with a wireless terminal via one or more sectors at an over-the-air interface in an access network. The base station may be configured to convert a received over-the-air frame to an IP packet and convert a received IP packet to an over-the-air frame, and serve as a router between the wireless terminal and a rest portion of the access network, where the rest portion of the access network may include an Internet protocol (IP) network. The base station may coordinate attribute management of the air interface. For example, the base station may be a base station in GSM or CDMA (Base Transceiver Station, BTS for short), may be a base station in WCDMA (NodeB), or may be an evolved NodeB in LTE (NodeB, eNB, or e-NodeB, evolutional Node B). This is not limited in this application.

FIG. 2 is a flowchart of a power control method according to Embodiment 1 of the present disclosure, where the method is executed by user equipment UE. As shown in FIG. 2, the method includes the following steps.

Step 101: Obtain a power control parameter for a sounding reference signal SRS, where the power control parameter for the SRS includes at least one of a target power parameter value for the SRS, a path loss compensation factor, and a closed-loop power control parameter value for the SRS.

In this embodiment, the UE may obtain the power control parameter for the SRS in different manners. For example, a base station transmits a preconfigured power control parameter for the SRS to the UE by using a switching-from or switched-to carrier for SRS transmission. Alternatively, the base station sends a target power parameter value for the SRS and a path loss compensation factor to the UE by using physical layer signaling or control signaling, and then indicates a closed-loop power control parameter value for the SRS to the UE by using transmission power control (Transmission power control, TPC) information. Alternatively, various values in the power control parameter for the SRS may be obtained in other manners.

Step 102: Determine transmit power for the SRS on a first carrier based on the power control parameter for the SRS.

In this embodiment, the first carrier is a switched-to carrier after SRS-based carrier switching, and also referred to as a non-uplink carrier, in order that SRS transmission is performed on the carrier. The UE may calculate the transmit power for the SRS on the first carrier based on the power control parameter for the SRS, so that the SRS is sent on the first carrier at appropriate transmit power.

In the power control method provided in this embodiment, the UE obtains the power control parameter for the SRS, where the power control parameter includes at least one of the target power parameter value for the SRS, the path loss compensation factor, and the closed-loop power control parameter value for the SRS, and determines the transmit power for the SRS on the first carrier based on the power control parameter for the SRS. The UE can calculate transmit power for the SRS on a switched-to carrier based on a newly configured power control parameter for the SRS, so that the SRS is transmitted at optimal transmit power on a switched-to carrier, ensuring that the SRS is received correctly.

Optionally, in the embodiment shown in FIG. 2, the first carrier is a carrier on which no physical uplink shared channel (Physical Uplink Shared Channel, PUSCH for short) is sent. That is, the first carrier is used for SRS sending, but not for PUSCH sending.

FIG. 3 is a flowchart of a power control method according to Embodiment 2 of the present disclosure, and the method shown in FIG. 3 is a specific implementation process of step 101. As shown in FIG. 3, the method includes the following steps.

Step 201: Receive power control signaling or cross-carrier power control signaling sent by a base station, where the power control signaling includes open-loop power control signaling and/or closed-loop power control signaling.

In this embodiment, the base station may deliver the power control signaling to UE by using power control signaling on a switched-to carrier to UE, or may indicate the power control signaling to the UE by using the cross-carrier power control signaling. The cross-carrier power control signaling includes signaling that is received on a switching-from carrier on which the SRS is located or any carrier other than the switched-to carrier, and that is used for notification about related power configuration for SRS transmission on the switched-to carrier after SRS-based carrier switching. In other words, the cross-carrier power control signaling is signaling sent by the base station on a switching-from carrier or any carrier other than the switched-to carrier, and the signaling includes the power control parameter for the SRS on the switched-to carrier. The open-loop power control signaling may include the target power parameter value for the SRS and the path loss compensation factor. The closed-loop power control signaling may include the target power parameter value for the SRS, the path loss compensation factor, and the closed-loop power control parameter value for the SRS.

Optionally, the power control signaling or the cross-carrier power control signaling includes radio resource control (Radio Resource Control, RRC) signaling or physical layer signaling.

Step 202: Obtain the power control parameter for the SRS from the power control signaling or the cross-carrier power control signaling.

In this embodiment, after the UE receives the power control signaling or the cross-carrier power control signaling delivered by the base station, the UE parses the power control signaling or the cross-carrier power control signaling, to obtain the power control parameter for the SRS.

Optionally, the target power parameter value for the SRS is a parameter value obtained based on a preamble initial received target power value; or the target power parameter value for the SRS is a parameter value obtained based on a preamble initial received target power value and a power adjustment value.

In this embodiment, the base station may send the preamble initial received target power value to the UE by using the power control signaling or the cross-carrier power control signaling, and the UE calculates the target power parameter value for the SRS based on the preamble initial received target power value. Alternatively, the base station may calculate the target power parameter value for the SRS by adding the preamble initial received target power value and the power adjustment value, and then send the calculated target power parameter value for the SRS to the UE by using the power control signaling or the cross-carrier power control signaling. The power adjustment value may alternatively be obtained from a response message of a specially defined random access channel (Random Access Channel, RACH for short). The power adjustment value is also referred to as a power offset or a power offset (power offset).

Further, the obtaining the power control parameter from the power control signaling or the cross-carrier control signaling includes: parsing out the power control parameter for the SRS from the power control signaling or the cross-carrier power control signaling based on a first radio network temporary identifier (Radio Network Temporary Identity, RNTI for short).

In this embodiment, the first RNTI is different from a prior-art TPC-RNTI. The first RNTI is an RNTI that is redefined in this application, and the first RNTI may be named TPC-SRS-RNTI. The first RNTI is used to scramble (scramble) or mask (mask) the power control parameter for the SRS, and the scrambled parameter is carried in the physical layer signaling for indication to the UE.

In the power control method provided in this embodiment, the UE receives the power control signaling or the cross-carrier power control signaling sent by the base station, and obtains the power control parameter for the SRS from the power control signaling or the cross-carrier power control signaling. The base station may indicate the power control parameter for the SRS to the UE by using RRC signaling, MAC signaling, or physical layer signaling, and may further scramble the power control parameter for the SRS by using the newly defined RNTI. The base station indicates the power control parameter for the SRS to the UE in different manners. The method is flexible, and features ease of operation.

Optionally, the determining transmit power for the SRS based on the power control parameter for the SRS includes: obtaining the transmit power for the SRS based on at least one of maximum transmit power of the user equipment UE, a transmit power adjustment value for the SRS, transmission bandwidth for the SRS, the target power parameter value for the SRS, the path loss compensation factor, and an estimated downlink path loss value.

Specifically, in an open-loop case, the determining transmit power for the SRS based on the power control parameter for the SRS includes: calculating the transmit power $P_{SRS,c1}(i)$ for the SRS according to a formula $P_{SRS,c1}(i) = \min\{P_{CMAX,c1}(i), P_{SRS\_OFFSET,c1}(m) + 10 \log_{10}(M_{SRS,c1}) + P_{O\_SRS,c1}(j) + \alpha_{SRS,c1}(j) \cdot PL_{c1}\}$, where $P_{CMAX,c1}(i)$ is maximum transmit power of the user equipment UE in an $i^{th}$ subframe; $P_{SRS\_OFFSET,c1}(m)$ is the transmit power adjustment value for the SRS, where m equals 0 or 1, $M_{SRS,c1}$ is the transmission bandwidth for the SRS; $P_{O\_SRS,c1}(j)$ is the target power parameter value for the SRS, where j equals 0, 1, or 2; $\alpha_{SRS,c1}(j)$ is the path loss compensation factor; and $PL_{c1}$ is the estimated downlink path loss value. $\alpha_{SRS,c1}(j)$ may be fixed to 1, and for $P_{O\_SRS,c1}(j)$, usually j equals 2. When j equals 0, $P_{O\_SRS,c1}(j)$ is a semi-persistent scheduling transmit power; when j equals 1, $P_{O\_SRS,c1}(j)$ is a dynamic scheduling transmit power; and when j equals 2, $P_{O\_SRS,c1}(j)$ is a random access scheduling transmit power.

Further, before the determining transmit power for the SRS based on the power control parameter for the SRS, the method further includes: determining whether the SRS is configured periodically or configured aperiodically.

In this embodiment, the UE may determine whether the SRS is configured periodically or configured aperiodically, and then determine the transmit power for the SRS based on a periodical configuration characteristic of the SRS and the power control parameter for the SRS, to ensure that the SRS can be received correctly in various circumstances.

Optionally, in a closed-loop circumstance, if the power control parameter for the SRS includes the closed-loop power control parameter value for the SRS, the closed-loop power control parameter value for the SRS is an absolute value or a relative adjustment value.

In this embodiment, if the closed-loop power control parameter value for the SRS is an absolute value, the absolute value may be directly used to calculate the transmit power for the SRS; if the closed-loop power control parameter value for the SRS is a relative adjustment value, the closed-loop power control parameter value for the SRS needs to be calculated first based on the relative adjustment value, and then the closed-loop power control parameter value for the SRS obtained through calculation is used to calculate the transmit power for the SRS.

Optionally, if the closed-loop power control parameter value for the SRS is a relative adjustment value, the method further includes: determining the closed-loop power control parameter value for the SRS based on at least one of closed-loop power control information or a relative adjustment value for an SRS in a previous subframe.

Specifically, the determining the closed-loop power control parameter value for the SRS based on at least one of closed-loop power control information or a relative adjustment value for an SRS in a previous subframe includes: calculating the closed-loop power control parameter value $f_{c1}(i)$ for the SRS according to a formula $f_{c1}(i)=f_{c1}(i-1)+\delta_{SRS,c1}(i-K_{SRS})$, where $f_{c1}(i-1)$ is the closed-loop power control information for the SRS in the previous subframe; $\delta_{SRS,c1}(i-K_{SRS})$ is the relative adjustment value; and if the SRS is configured periodically, $K_{SRS}$ is a subframe periodicity of the SRS, or if the SRS is configured aperiodically, $i-K_{SRS}$ is a subframe number of the previous subframe.

Further, the determining transmit power for the SRS based on the power control parameter for the SRS includes: obtaining the transmit power for the SRS based on at least one of maximum transmit power of the user equipment UE, a transmit power adjustment value for the SRS, transmission bandwidth for the SRS, the target power parameter value for the SRS, the path loss compensation factor, an estimated downlink path loss value, and the closed-loop power control parameter for the SRS.

Specifically, the determining transmit power for the SRS based on the power control parameter for the SRS includes: calculating the transmit power $P_{SRS,c1}(i)$ for the SRS according to a formula $P_{SRS,c1}(i)=\min\{P_{CMAX,c1}(i), P_{SRS\_OFFSET,c1}(m)+10\log_{10}(M_{SRS,c1})+P_{O\_SRS,c1}(j)+\alpha_{SRS,c1}(j)\cdot PL_{c1}+f_{SRS,c1}(i)\}$, where $P_{CMAX,c1}(i)$ is maximum transmit power of the user equipment UE in an $i^{th}$ subframe on a switched-to carrier C1; $P_{SRS\_OFFSET,c1}(m)$ is the transmit power adjustment value for the SRS, where m equals 0 or 1; $M_{SRS,c1}$ is the transmission bandwidth for the SRS; $P_{O\_SRS,c1}(j)$ is the target power parameter value for the SRS; $\alpha_{SRS,c1}(j)$ is the path loss compensation factor; $PL_{c1}$ is the estimated downlink path loss value; and $f_{c1}(i)$ is the closed-loop power control parameter value for the SRS. $\alpha_{SRS,c1}(j)$ may be fixed to 1, and for $P_{O\_SRS,c1}(j)$, usually j equals 2. When j equals 0, $P_{O\_SRS,c1}(j)$ is a semi-persistent scheduling transmit power; when j equals 1, $P_{O\_SRS,c1}(j)$ is a dynamic scheduling transmit power; and when j equals 2, $P_{O\_SRS,c1}(j)$ is a random access scheduling transmit power.

Further, before the obtaining the power control parameter for the SRS, the method further includes: obtaining transmission power control TPC information, where the TPC information is information scrambled or masked with the first RNTI.

Still further, the obtaining the power control parameter for the SRS includes: parsing out the closed-loop power control parameter value for the SRS from the TPC information based on the first RNTI.

In this embodiment, the closed-loop power control parameter value for the SRS may be included in the TPC information scrambled with the first RNTI, and the first RNTI is indicated to the UE in advance. The UE may descramble the TPC information based on the first RNTI, to obtain the closed-loop power control parameter value for the SRS.

Still further, if the power control parameter for the SRS includes the closed-loop power control parameter value for the SRS, before the obtaining the power control parameter for the SRS, the method further includes: obtaining downlink control information (Downlink Control Information, DCI for short).

Still further, the obtaining the power control parameter for the SRS includes: obtaining the closed-loop power control parameter value for the SRS based on the DCI.

In this embodiment, different formats of DCI may be defined specifically as follows:

A first DCI format: if the DCI is control information obtained on a second carrier, the DCI includes at least a first carrier index, where the second carrier is a switching-from carrier or any carrier other than a switched-to carrier, and the first carrier is the switched-to carrier.

Correspondingly, in this embodiment, the obtaining the closed-loop power control parameter value for the SRS based on the DCI includes: obtaining the closed-loop power control parameter value for the SRS on a carrier corresponding to the first carrier index.

In this embodiment, in the case of cross-carrier notification, DCI obtained on a switching-from carrier needs to include at least an index of a switched-to carrier, so that the UE obtains, based on the first carrier index, the closed-loop power control parameter value for the SRS on a carrier corresponding to the carrier index.

A second DCI format: if the DCI is control information obtained on the first carrier, the obtaining the closed-loop power control parameter value for the SRS based on the DCI includes: obtaining the closed-loop power control parameter value for the SRS from the DCI.

In this embodiment, when the DCI is control information obtained on a switched-to carrier, the closed-loop power control parameter value for the SRS in the new DCI format is used directly to perform SRS transmission power control.

Figure 4:
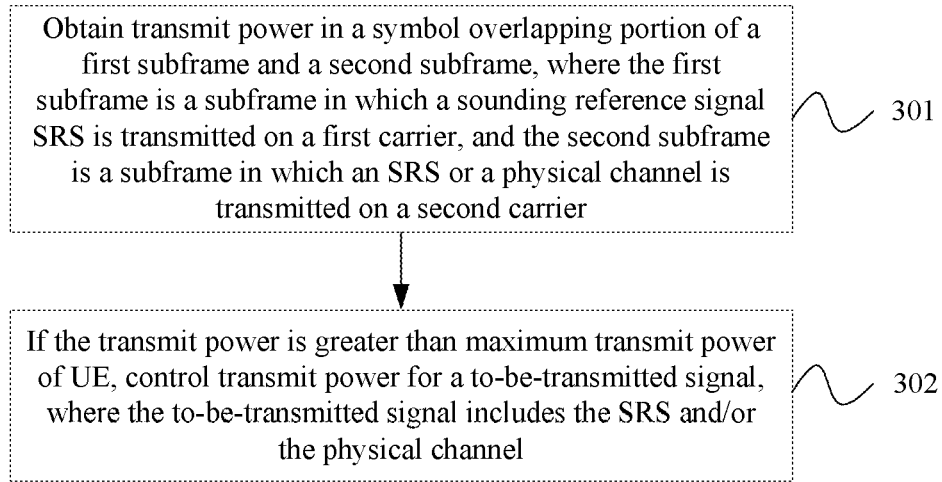
FIG. 4 is a flowchart of a power control method according to Embodiment 3 of the present disclosure.

FIG. 4 is a flowchart of a power control method according to Embodiment 3 of the present disclosure. The method relates to how power control is performed when SRS-based carrier switching is triggered, if symbols of two subframes overlap and transmit power in an overlapping portion exceeds maximum transmit power of UE. As shown in FIG. 4, the method includes the following steps.

Step 301: Obtain transmit power in a symbol overlapping portion of a first subframe and a second subframe, where the first subframe is a subframe in which a sounding reference signal SRS is transmitted on a first carrier, and the second subframe is a subframe in which an SRS or a physical channel is transmitted on a second carrier.

In this embodiment, if a symbol of a subframe in which the sounding reference signal SRS is transmitted on the first carrier overlaps a symbol of a subframe in which the SRS or the physical channel is transmitted on the second carrier, the transmit power in the symbol overlapping portion needs to be calculated. For example, when a plurality of timing advance groups (Timing Advance Group, TAG for short) are configured for UE, when a symbol in subframe i for SRS transmission of the UE on one assumed serving carrier/cell in one TAG overlaps a symbol in a subframe i or a subframe i+1 used for PUCCH transmission on another serving carrier/cell, transmit power in the symbol overlapping portion is calculated.

Step 302: If the transmit power is greater than maximum transmit power of UE, control transmit power for a to-be-transmitted signal, where the to-be-transmitted signal includes the SRS and/or the physical channel.

In this embodiment, if the transmit power is greater than the maximum transmit power of the UE, the transmit power for the to-be-transmitted signal is controlled. For example, if the transmit power is greater than the maximum transmit power of the UE, a portion of the to-be-transmitted signal is appropriately dropped, or power scaling is performed on the to-be-transmitted signal.

In the power control method provided in this embodiment, the UE obtains the transmit power in the symbol overlapping portion of the first subframe in which the sounding reference signal SRS is transmitted on the first carrier and the second subframe in which the SRS or the physical channel is transmitted on the second carrier, and if the transmit power is greater than the maximum transmit power of the UE, controls the transmit power for the to-be-transmitted signal, so that the to-be-transmitted signal is transmitted at appropriate power, ensuring transmission efficiency of the to-be-transmitted signal.

Optionally, before the controlling transmit power for a to-be-transmitted signal, the method further includes: determining whether the SRS is configured periodically or configured aperiodically.

Further, the controlling transmit power for a to-be-transmitted signal includes: controlling the transmit power for the to-be-transmitted signal based on a periodical configuration of the SRS; or controlling the transmit power for the to-be-transmitted signal based on an aperiodical configuration of the SRS.

In this embodiment, dropping a portion of the to-be-transmitted signal or performing power scaling for a portion of the to-be-transmitted signal may be selected based on a periodical characteristic of the SRS.

Optionally, if the SRS is configured periodically, the controlling transmit power for a to-be-transmitted signal includes: dropping the SRS or performing power scaling for the SRS.

Optionally, if the SRS is configured aperiodically, the physical channel is a physical uplink shared channel PUSCH, and the PUSCH does not include uplink control information UCI, the controlling transmit power for a to-be-transmitted signal includes: dropping the PUSCH or performing power scaling for the PUSCH.

Optionally, if the SRS is configured aperiodically, the physical channel is a physical uplink shared channel PUSCH, and the PUSCH includes uplink control information UCI, the controlling transmit power for a to-be-transmitted signal includes: dropping the SRS or performing power scaling for the SRS.

Optionally, if the SRS is configured aperiodically, and the physical channel is a physical uplink control channel PUCCH, the controlling transmit power for a to-be-transmitted signal includes: dropping the SRS or performing power scaling for the SRS; or dropping the PUCCH or performing power scaling for the PUCCH.

Optionally, if the SRS is configured aperiodically, the physical channel is a physical uplink control channel PUCCH, and the PUCCH includes a hybrid automatic repeat request HARQ, the controlling transmit power for a to-be-transmitted signal includes: dropping the SRS or performing power scaling for the SRS.

Optionally, if the SRS is configured aperiodically, the physical channel is a PUCCH, and the PUCCH includes only channel state information (Channel State Information, CSI for short), the controlling transmit power for a to-be-transmitted signal includes: dropping the SRS or performing power scaling for the SRS; or dropping the PUCCH or performing power scaling for the PUCCH.

In this embodiment, when the SRS is configured aperiodically, the physical channel is a PUCCH, the PUCCH includes only CSI, and the PUCCH does not include a hybrid automatic repeat request (Hybrid Automatic Repeat reQuest, HARQ for short), the controlling transmit power for a to-be-transmitted signal includes: dropping the SRS or performing power scaling for the SRS; or dropping the PUCCH or performing power scaling for the PUCCH.

Optionally, if the SRS is configured aperiodically, the physical channel is a packet random access channel PRACH, and the PRACH is concurrent, the controlling transmit power for a to-be-transmitted signal includes: dropping the SRS or performing power scaling for the SRS.

The following describes the method of "controlling the transmit power for the to-be-transmitted signal based on a periodical characteristic of the SRS" in detail based on different UE configurations.

Case 1:

When a plurality of TAGs are configured for the UE, when a symbol in a subframe i used for SRS transmission of the UE on one assumed serving carrier/cell in one TAG overlaps a symbol in a subframe i or a subframe i+1 used for PUCCH/PUSCH transmission on another serving carrier/cell, if the transmit power in the symbol overlapping portion exceeds the maximum transmit power of the UE, the following cases apply:

(1) When the SRS is configured periodically, if transmit power in any overlapping symbol exceeds the maximum transmit power of the UE, the UE drops SRS transmission or performs power scaling for SRS transmission.

(2) When the SRS is configured aperiodically, if transmit power in any overlapping symbol exceeds the maximum transmit power of the UE, only a PUSCH is present, and the PUSCH does not include uplink control information (uplink control information, UCI for short), the UE drops PUSCH transmission or performs power scaling for PUSCH transmission; or the UE drops SRS transmission or performs power scaling for SRS transmission.

(3) When the SRS is configured aperiodically, if transmit power in any overlapping symbol exceeds the maximum transmit power of the UE, only a PUSCH is present, and the PUSCH includes UCI, the UE drops SRS transmission or performs power scaling for SRS transmission.

(4) When the SRS is configured aperiodically, if transmit power in any overlapping symbol exceeds the maximum transmit power of the UE, and a PUCCH is present, the UE drops SRS transmission or performs power scaling for SRS transmission; or the UE drops PUSCH transmission or performs power scaling for PUSCH transmission.

(5) When the SRS is configured aperiodically, if transmit power in any overlapping symbol exceeds the maximum transmit power of the UE, a PUCCH is present, and the PUCCH includes a hybrid automatic repeat request (Hybrid Automatic Repeat reQuest, HARQ for short), the UE drops SRS transmission or performs power scaling for SRS transmission.

(6) When the SRS is configured aperiodically, if transmit power in any overlapping symbol exceeds the maximum transmit power of the UE, a PUCCH is present, and the PUCCH includes only CSI, the UE drops SRS transmission or the PUCCH; or the UE performs power scaling for SRS transmission or performs power scaling for the PUCCH.

Case 2:

When a plurality of TAGs and more than two serving carriers/cells are configured for the UE, when a symbol in a subframe i used for SRS transmission on one serving carrier/cell overlaps a symbol in a subframe i used for SRS transmission on another serving carrier/cell, and/or overlaps a symbol in a subframe i or a subframe i+1 used for PUCCH/PUSCH transmission on another serving carrier/cell, if transmit power for the symbol overlapping portion exceeds the maximum transmit power of the UE, the following cases apply:

(1) When the SRS is configured periodically, if transmit power in any overlapping symbol exceeds the maximum transmit power of the UE, the UE drops SRS transmission or performs power scaling for SRS transmission.

(2) When the SRS is configured aperiodically, if transmit power in any overlapping symbol exceeds the maximum transmit power of the UE, only a PUSCH is present, and the PUSCH does not include uplink control information UCI, the UE drops PUSCH transmission or performs power scaling for PUSCH transmission; or the UE drops SRS transmission or performs power scaling for SRS transmission.

(3) When the SRS is configured aperiodically, if transmit power in any overlapping symbol exceeds the maximum transmit power of the UE, only a PUSCH is present, and the PUSCH includes uplink control information UCI (uplink control information), the UE drops SRS transmission or performs power scaling for SRS transmission.

(4) When the SRS is configured aperiodically, if transmit power in any overlapping symbol exceeds the maximum transmit power of the UE, and a PUCCH is present, the UE drops SRS transmission or performs power scaling for SRS transmission; or the UE drops PUSCH transmission or performs power scaling for PUSCH transmission.

(5) When the SRS is configured aperiodically, if transmit power in any overlapping symbol exceeds the maximum transmit power of the UE, a PUCCH is present, and the PUCCH includes HARQ, the UE drops SRS transmission or performs power scaling for SRS transmission.

(6) When the SRS is configured aperiodically, if transmit power in any overlapping symbol exceeds the maximum transmit power of the UE, a PUCCH is present, and the PUCCH includes only CSI, the UE drops SRS transmission or the PUCCH; or the UE performs power scaling for SRS transmission or performs power scaling for the PUCCH.

Case 3:

When a plurality of TAGs are configured for the UE, the UE transmits a physical random access channel (Physical Random Access Channel, PRACH for short) on a secondary serving carrier/cell, and the PRACH is concurrent in a symbol in a subframe used for SRS transmission on a different serving carrier/cell, if the transmit power in the symbol overlapping portion exceeds the maximum transmit power of the UE, the following cases apply:

(1) When the SRS is configured periodically, if transmit power in any overlapping symbol exceeds the maximum transmit power of the UE, the UE drops SRS transmission or performs power scaling for SRS transmission.

(2) When the SRS is configured periodically, if transmit power in any overlapping symbol exceeds the maximum transmit power of the UE, and a PRACH is concurrent, the UE drops SRS transmission or performs power scaling for SRS transmission.

Figure 5:
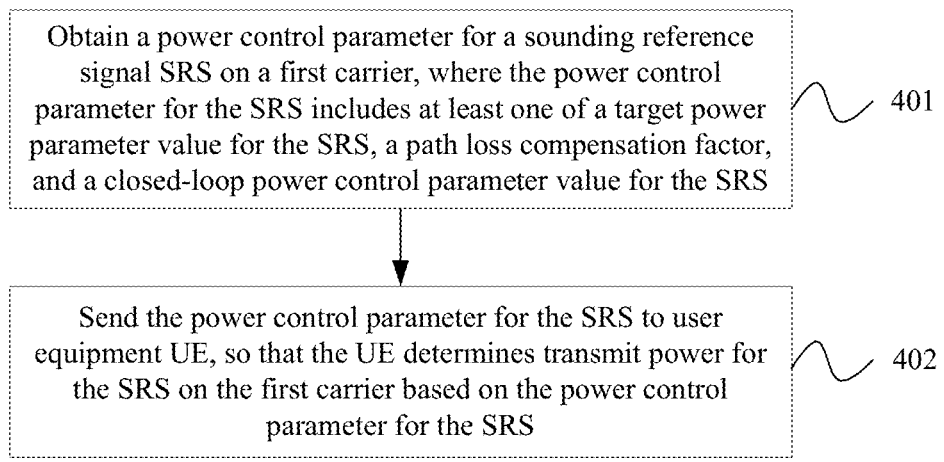
FIG. 5 is a flowchart of a power control method according to Embodiment 4 of the present disclosure.

FIG. 5 is a flowchart of a power control method according to Embodiment 4 of the present disclosure. The method is executed by a base station. As shown in FIG. 5, the method includes the following steps.

Step 401: Obtain a power control parameter for a sounding reference signal SRS on a first carrier, where the power control parameter for the SRS includes at least one of a target power parameter value for the SRS, a path loss compensation factor, and a closed-loop power control parameter value for the SRS.

In this embodiment, the power control parameter for the SRS is specially configured, in order to calculate transmit power for the SRS on a switched-to carrier.

Step 402: Send the power control parameter for the SRS to user equipment UE, so that the UE determines transmit power for the SRS on the first carrier based on the power control parameter for the SRS.

In this embodiment, the base station may send the power control parameter for the SRS in different manners. For example, the base station transmits a preconfigured power control parameter for the SRS to the UE by using a switched-to carrier for SRS transmission. Alternatively, the base station sends a target power parameter value for the SRS and a path loss compensation factor to the UE by using physical layer signaling or control signaling, and then indicates a closed-loop power control parameter value for the SRS to the UE by using transmission power control (Transmission power control, TPC) information. Alternatively, the base station sends various values in the power control parameter for the SRS to the UE in other manners. The UE may calculate the transmit power for the SRS on the first carrier based on the power control parameter for the SRS, so that the SRS is sent on the first carrier at appropriate transmit power.

In the power control method provided in this embodiment, the base station obtains the power control parameter for the SRS on the first carrier, where the power control parameter includes at least one of the target power parameter value for the SRS, the path loss compensation factor, and the closed-loop power control parameter value for the SRS, sends the power control parameter for the SRS to the user equipment UE, so that the UE determines the transmit power for the SRS on the first carrier based on the power control parameter for the SRS. In this way, the UE can calculate transmit power for the SRS on a switched-to carrier based on a newly configured power control parameter for the SRS, so that the SRS is transmitted on the switched-to carrier at optimal transmit power, ensuring that the SRS is received correctly.

Optionally, the first carrier is a carrier on which no PUSCH is sent.

Optionally, the sending the power control parameter for the SRS to user equipment UE includes: sending the power control parameter for the SRS to the UE by using power control signaling or cross-carrier power control signaling.

The power control signaling includes open-loop power control signaling and/or closed-loop power control signaling.

The power control signaling or the cross-carrier power control signaling includes radio resource control RRC signaling or physical layer signaling.

Optionally, the target power parameter value for the SRS is a parameter value obtained based on a preamble initial received target power value; or the target power parameter value for the SRS is a parameter value obtained based on a preamble initial received target power value and a power adjustment value.

Further, the sending the power control parameter for the SRS to the UE by using power control signaling or cross-carrier power control signaling includes: scrambling the power control parameter for the SRS based on a first radio network temporary identifier RNTI, to generate the power control signaling or the cross-carrier power control signaling; and sending the power control signaling or the cross-carrier power control signaling to the UE.

Optionally, the SRS is configured periodically or configured aperiodically.

Further, if the power control parameter for the SRS includes the closed-loop power control parameter value for the SRS, the closed-loop power control parameter value for the SRS is an absolute value or a relative adjustment value.

Still further, the method further includes: sending TPC information to the UE, so that the UE parses out the closed-loop power control parameter value for the SRS from the TPC information, where the TPC information is information scrambled with the first radio network temporary identifier RNTI.

Still further, if the power control parameter for the SRS includes the closed-loop power control parameter for the SRS, the method further includes: sending downlink control information DCI to the UE, so that the UE obtains the closed-loop power control parameter value for the SRS based on the DCI.

Optionally, if the DCI is control information obtained on a second carrier, the DCI includes at least a first carrier index, and the DCI is used to instruct the UE to obtain the closed-loop power control parameter value for the SRS on a carrier corresponding to the first carrier index.

The second carrier is a switching-from carrier or any carrier other than a switched-to carrier, and the first carrier is the switched-to carrier.

Optionally, if the DCI is control information obtained on the first carrier, the DCI is used to instruct the UE to obtain the closed-loop power control parameter value for the SRS from the DCI.

The power control method provided in this embodiment is implemented by a base station and is corresponding to the UE-side power control method. For detailed descriptions about an implementation principle and specific technical features of the method, refer to the UE-side power control method in the embodiments in FIG. 2 to FIG. 4. Details are not described herein again.

Figure 6:
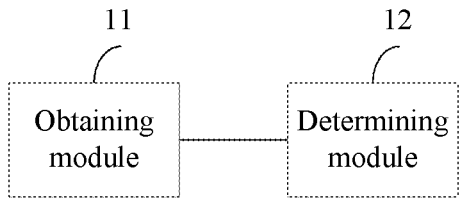
FIG. 6 is a structural diagram of a power control apparatus according to Embodiment 5 of the present disclosure.

FIG. 6 is a structural diagram of a power control apparatus according to Embodiment 5 of the present disclosure. As shown in FIG. 6, the apparatus includes an obtaining module 11 and a determining module 12. The obtaining module 11 is configured to obtain a power control parameter for a sounding reference signal SRS, where the power control parameter for the SRS includes at least one of a target power parameter value for the SRS, a path loss compensation factor, and a closed-loop power control parameter value for the SRS. The determining module 12 is configured to determine transmit power for the SRS on a first carrier based on the power control parameter for the SRS.

The apparatus in this embodiment may be configured to execute the technical solution of the method embodiment shown in FIG. 2. Their implementation principles and technical effects are similar, and no more details are provided herein.

Optionally, the first carrier is a carrier on which no physical uplink shared channel PUSCH is sent.

Optionally, the obtaining module 11 is specifically configured to obtain power control signaling or cross-carrier power control signaling sent by a base station.

Optionally, the power control signaling includes open-loop power control signaling and/or closed-loop power control signaling.

Optionally, the obtaining module 11 is specifically further configured to obtain the power control parameter for the SRS from the power control signaling or the cross-carrier power control signaling.

Optionally, the power control signaling or the cross-carrier power control signaling includes radio resource control RRC signaling or physical layer signaling.

Optionally, the target power parameter value for the SRS is a parameter value obtained based on a preamble initial received target power value; or the target power parameter value for the SRS is a parameter value obtained based on a preamble initial received target power value and a power adjustment value.

Optionally, that the obtaining module 11 obtains the power control parameter from the power control signaling or the cross-carrier power control signaling includes that the obtaining module 11 parses out the power control parameter for the SRS from the power control signaling or the cross-carrier power control signaling based on a first radio network temporary identifier RNTI.

Optionally, the determining module 12 is specifically configured to obtain the transmit power for the SRS based on at least one of maximum transmit power of user equipment UE, a transmit power adjustment value for the SRS, transmission bandwidth for the SRS, the target power parameter value for the SRS, the path loss compensation factor, and an estimated downlink path loss value.

Optionally, the determining module 12 is specifically configured to calculate the transmit power $P_{SRS,c1}(i)$ for the SRS according to a formula $P_{SRS,c1}(i)=\min\{P_{CMAX,c1}(i), P_{SRS\_OFFSET,c1}(m)+10\ \log_{10}(M_{SRS,c1})+P_{O\_SRS,c1}(j)+\alpha_{SRS,c1}(j)\cdot PL_{SRS,c1}\}$, where $P_{CMAX,c1}(i)$ is maximum transmit power of the user equipment UE in an $i^{th}$ subframe; $P_{SRS\_OFFSET,c1}(m)$ is the transmit power adjustment value for the SRS, where m equals 0 or 1; $M_{SRS,c1}$ is the transmission bandwidth for the SRS; $P_{O\_SRS,c1}(j)$ is the target power parameter value for the SRS, where j equals 0, 1, or 2; $\alpha_{SRS,c1}(j)$ is the path loss compensation factor; and $PL_{SRS,c1}$ is the estimated downlink path loss value.

Optionally, the determining module 12 is further configured to determine whether the SRS is configured periodically or configured aperiodically.

Optionally, if the power control parameter for the SRS includes the closed-loop power control parameter value for the SRS, the closed-loop power control parameter value for the SRS is an absolute value or a relative adjustment value.

Optionally, the obtaining module 11 is further configured to obtain transmission power control TPC information, where the TPC information is information scrambled with the first radio network temporary identifier RNTI.

Optionally, that the obtaining module 11 obtains the power control parameter for the SRS includes that the obtaining module 11 parses out the closed-loop power control parameter value for the SRS from the TPC information based on the first RNTI.

Optionally, if the power control parameter for the SRS includes the closed-loop power control parameter value for the SRS, the obtaining module 11 is further configured to obtain downlink control information DCI.

Optionally, that the obtaining module 11 obtains the power control parameter for the SRS includes that the obtaining module 11 obtains the closed-loop power control parameter value for the SRS based on the DCI.

Optionally, if the DCI is control information obtained on a second carrier, the DCI includes at least a first carrier index.

Optionally, the second carrier is a switching-from carrier or any carrier other than a switched-to carrier, and the first carrier is the switched-to carrier.

Optionally, that the obtaining module 11 obtains the closed-loop power control parameter value for the SRS based on the DCI includes that the obtaining module 11 obtains the closed-loop power control parameter value for the SRS on a carrier corresponding to the first carrier index.

Optionally, if the DCI is control information obtained on the first carrier, that the obtaining module 11 obtains the closed-loop power control parameter value for the SRS based on the DCI includes that the obtaining module 11 obtains the closed-loop power control parameter value for the SRS from the DCI.

Optionally, if the closed-loop power control parameter value for the SRS is a relative adjustment value, the determining module 12 is further configured to determine the closed-loop power control parameter value for the SRS based on at least one of closed-loop power control information or a relative adjustment value for an SRS in a previous subframe.

Optionally, that the determining module 12 determines the closed-loop power control parameter for the SRS based on at least one of closed-loop power control information or a relative adjustment value for an SRS in a previous subframe includes that the determining module 12 calculates the closed-loop power control parameter value $f_{SRS,c1}(i)$ for the SRS according to a formula $f_{SRS,c1}(i)=f_{SRS,c1}(i-1)+\delta_{SRS,c1}(i-K_{SRS})$, where $f_{SRS,c1}(i-1)$ is the closed-loop power control information for the SRS in the previous subframe; $\delta_{SRS,c1}(i-K_{SRS})$ is the relative adjustment value; and if the SRS is configured periodically, $K_{SRS}$ is a subframe periodicity of the SRS, or if the SRS is configured aperiodically, $i-K_{SRS}$ is a subframe number of the previous subframe.

Optionally, that the determining module 12 determines transmit power for the SRS based on the power control parameter for the SRS includes that the determining module 12 obtains the transmit power for the SRS based on at least one of maximum transmit power of the user equipment UE, a transmit power adjustment value for the SRS, transmission bandwidth for the SRS, the target power parameter value for the SRS, the path loss compensation factor, the estimated downlink path loss value, and a closed-loop power control parameter for the SRS.

Optionally, that the determining module 12 determines transmit power for the SRS based on the power control parameter for the SRS includes that the determining module 12 calculates the transmit power $P_{SRS,c1}(i)$ for the SRS according to a formula $P_{SRS,c1}(i)=\min\{P_{CMAX,c1}(i), P_{SRS\_OFFSET,c1}(m)+10\log_{10}(M_{SRS,c1})+P_{O\_SRS,c1}(j)+\alpha_{SRS,c1}(j)\cdot PL_{SRS,c1}+f_{SRS,c1}(i)\}$, where $P_{CMAX,c1}(i)$ is maximum transmit power of the user equipment UE in an $i^{th}$ subframe; $P_{SRS\_OFFSET,c1}(m)$ is the transmit power adjustment value for the SRS, where m equals 0 or 1, $M_{SRS,c1}$ is the transmission bandwidth for the SRS; $P_{O\_SRS,c1}(j)$ is the target power parameter value for the SRS; $\alpha_{SRS,c1}(j)$ is the path loss compensation factor; $PL_{SRS,c1}$ is the estimated downlink path loss value; and $f_{SRS,c1}(i)$ is the closed-loop power control parameter value for the SRS.

The apparatus in this embodiment may be configured to execute the technical solution of the method embodiment shown in FIG. 2 or FIG. 3. Their implementation principles and technical effects are similar, and no more details are provided herein.

Figure 7:
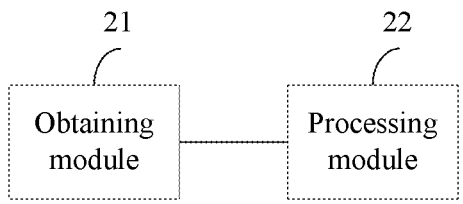
FIG. 7 is a structural diagram of a power control apparatus according to Embodiment 6 of the present disclosure.

FIG. 7 is a structural diagram of a power control apparatus according to Embodiment 6 of the present disclosure. As shown in FIG. 7, the apparatus includes an obtaining module 21 and a processing module 22. The obtaining module 21 is configured to obtain transmit power in a symbol overlapping portion of a first subframe and a second subframe, where the first subframe is a subframe in which a sounding reference signal SRS is transmitted on a first carrier, and the second subframe is a subframe in which an SRS or a physical channel is transmitted on a second carrier. The processing module 22 is configured to, if the transmit power is greater than maximum transmit power of user equipment UE, control transmit power for a to-be-transmitted signal, where the to-be-transmitted signal includes the SRS and/or the physical channel.

Optionally, the processing module 22 is further configured to determine whether the SRS is configured periodically or configured aperiodically.

Optionally, that the processing module 22 controls transmit power for a to-be-transmitted signal includes that the processing module 22 controls the transmit power for the to-be-transmitted signal based on a periodical configuration of the SRS; or that the processing module 22 controls the transmit power for the to-be-transmitted signal based on an aperiodical configuration of the SRS.

Optionally, if the SRS is configured periodically, that the processing module 22 controls transmit power for a to-be-transmitted signal includes that the processing module 22 drops the SRS or performs power scaling for the SRS.

Optionally, if the SRS is configured aperiodically, the physical channel is a physical uplink shared channel PUSCH, and the PUSCH does not include uplink control information UCI, that the processing module 22 controls transmit power for a to-be-transmitted signal includes that the processing module 22 drops the PUSCH or performs power scaling for the PUSCH.

Optionally, if the SRS is configured aperiodically, the physical channel is a physical uplink shared channel PUSCH, and the PUSCH includes uplink control information UCI, that the processing module 22 controls transmit power for a to-be-transmitted signal includes that the processing module 22 drops the SRS or performs power scaling for the SRS.

Optionally, if the SRS is configured aperiodically, and the physical channel is a physical uplink control channel PUCCH, that the processing module 22 controls transmit power for a to-be-transmitted signal includes that the processing module 22 drops the SRS or performs power scaling for the SRS; or that the processing module 22 drops the PUCCH or performs power scaling for the PUCCH.

Optionally, if the SRS is configured aperiodically, the physical channel is a physical uplink control channel PUCCH, and the PUCCH includes a hybrid automatic repeat request HARQ, that the processing module 22 controls transmit power for a to-be-transmitted signal includes that the processing module 22 drops the SRS or performs power scaling for the SRS.

Optionally, if the SRS is configured aperiodically, the physical channel is a physical uplink control channel PUCCH, and the PUCCH includes only channel state information CSI, that the processing module 22 controls transmit power for a to-be-transmitted signal that the processing module 22 drops the SRS or performs power scaling for the SRS; or that the processing module 22 drops the PUCCH or performs power scaling for the PUCCH.

Optionally, if the SRS is configured aperiodically, the physical channel is a packet random access channel PRACH, and the PRACH is concurrent, that the processing module 22 controls transmit power for a to-be-transmitted signal includes that the processing module 22 drops the SRS or performs power scaling for the SRS.

The apparatus in this embodiment may be configured to execute the technical solution of the method embodiment shown in FIG. 4. Their implementation principles and technical effects are similar, and no more details are provided herein.

Figure 8:
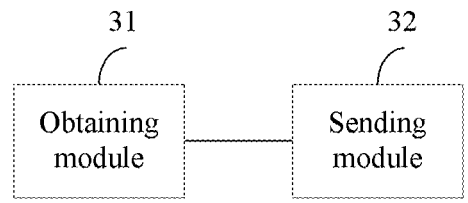
FIG. 8 is a structural diagram of a power control apparatus according to Embodiment 7 of the present disclosure.

FIG. 8 is a structural diagram of a power control apparatus according to Embodiment 7 of the present disclosure. As shown in FIG. 8, the apparatus includes an obtaining module 31 and a sending module 32. The obtaining module 31 is configured to obtain a power control parameter for a sounding reference signal SRS on a first carrier, where the power control parameter for the SRS includes at least one of a target power parameter value for the SRS, a path loss compensation factor, and a closed-loop power control parameter value for the SRS. The sending module 32 is configured to send the power control parameter for the SRS to user equipment UE, so that the UE determines transmit power for the SRS on the first carrier based on the power control parameter for the SRS.

Optionally, the first carrier is a carrier on which no physical uplink shared channel PUSCH is sent.

Optionally, the sending module is specifically configured to send the power control parameter for the SRS to the UE by using power control signaling or cross-carrier power control signaling.

Optionally, the power control signaling includes open-loop power control signaling and/or closed-loop power control signaling.

Optionally, the power control signaling or the cross-carrier power control signaling includes radio resource control RRC signaling or physical layer signaling.

Optionally, the target power parameter value for the SRS is a parameter value obtained based on a preamble initial received target power value; or the target power parameter value for the SRS is a parameter value obtained based on a preamble initial received target power value and a power adjustment value.

Optionally, that the sending module sends the power control parameter for the SRS to the UE by using power control signaling or cross-carrier power control signaling includes that the sending module scrambles the power control parameter for the SRS based on a first radio network temporary identifier RNTI, to generate the power control signaling or the cross-carrier power control signaling; and sends the power control signaling or the cross-carrier power control signaling to the UE.

Optionally, the SRS is configured periodically or configured aperiodically.

Optionally, if the power control parameter for the SRS includes the closed-loop power control parameter value for the SRS, the closed-loop power control parameter value for the SRS is an absolute value or a relative adjustment value.

Optionally, the sending module is further configured to send transmission power control TPC information to the UE, so that the UE parses out the closed-loop power control parameter value for the SRS from the TPC information, where the TPC information is information scrambled with the first radio network temporary identifier RNTI.

Optionally, if the power control parameter for the SRS includes the closed-loop power control parameter for the SRS, the sending module is further configured to send downlink control information DCI to the UE, so that the UE obtains the closed-loop power control parameter value for the SRS based on the DCI.

Optionally, if the DCI is control information obtained on a second carrier, the DCI includes at least a first carrier index, and the DCI is used to instruct the UE to obtain the closed-loop power control parameter value for the SRS on a carrier corresponding to the first carrier index.

Optionally, the second carrier is a switching-from carrier or any carrier other than a switched-to carrier, and the first carrier is the switched-to carrier.

Optionally, if the DCI is control information obtained on the first carrier, the DCI is used to instruct the UE to obtain the closed-loop power control parameter value for the SRS from the DCI.

The apparatus in this embodiment may be configured to execute the technical solution of the method embodiment shown in FIG. 5. Their implementation principles and technical effects are similar, and no more details are provided herein.

Figure 9:
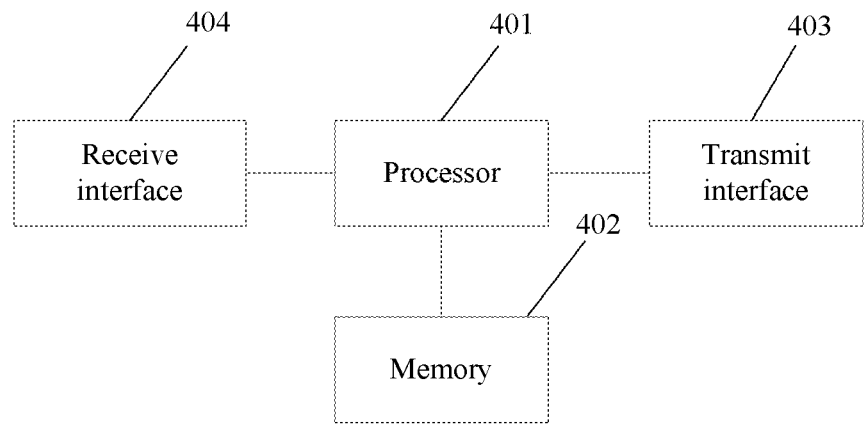
FIG. 9 is a structural diagram of UE according to Embodiment 8 of the present disclosure.

FIG. 9 is a structural diagram of UE according to Embodiment 8 of the present disclosure. The UE may include a processor 401 and a memory 402. The apparatus may further include a transmit interface 403 and a receive interface 404. The transmit interface 403 and the receive interface 404 may be connected to the processor 401. The transmit interface 403 is used to send data or information, and the transmit interface 403 may be a radio transmitting apparatus. The receive interface 404 is used to receive data or information, and the receive interface 404 may be a radio receiving apparatus. The memory 402 stores an executable instruction. When the apparatus runs, the processor 401 communicates with the memory 402, and the processor 401 call the executable instruction in the memory 402 to perform the following operations: obtaining a power control parameter for a sounding reference signal SRS, where the power control parameter for the SRS includes at least one of a target power parameter value for the SRS, a path loss compensation factor, and a closed-loop power control parameter value for the SRS; and determining transmit power for the SRS on a first carrier based on the power control parameter for the SRS.

Optionally, the first carrier is a carrier on which no physical uplink shared channel PUSCH is sent.

Optionally, that the processor 401 obtains a power control parameter for a sounding reference signal SRS includes that the processor 401 receives power control signaling or cross-carrier power control signaling sent by a base station.

Optionally, the power control signaling includes open-loop power control signaling and/or closed-loop power control signaling.

Optionally, that the processor 401 obtains a power control parameter for a sounding reference signal SRS includes that the processor 401 obtains the power control parameter for the SRS from the power control signaling or the cross-carrier power control signaling.

Optionally, the power control signaling or the cross-carrier power control signaling includes radio resource control RRC signaling or physical layer signaling.

Optionally, the target power parameter value for the SRS is a parameter value obtained based on a preamble initial received target power value; or the target power parameter value for the SRS is a parameter value obtained based on a preamble initial received target power value and a power adjustment value.

Optionally, that the processor 401 obtains the power control parameter from the power control signaling or the cross-carrier power control signaling includes that the processor 401 parses out the power control parameter for the SRS from the power control signaling or the cross-carrier power control signaling based on a first radio network temporary identifier RNTI.

Optionally, that the processor 401 determines transmit power for the SRS based on the power control parameter for the SRS includes that the processor 401 obtains the transmit power for the SRS based on at least one of maximum transmit power of user equipment UE, a transmit power adjustment value for the SRS, transmission bandwidth for the SRS, the target power parameter value for the SRS, the path loss compensation factor, and an estimated downlink path loss value.

Optionally, that the processor 401 determines transmit power for the SRS based on the power control parameter for the SRS includes that the processor 401 calculates the transmit power $P_{SRS,c1}(i)$ for the SRS according to a formula $P_{SRS,c1}(i)=\min\{P_{CMAX,c1}(i), P_{SRS\_OFFSET,c1}(m)+10 \log_{10}(M_{SRS,c1})+P_{O\_SRS,c1}(j)+\alpha_{SRS,c1}(j)\cdot PL_{SRS,c1}\}$, where $P_{CMAX,c1}(i)$ is maximum transmit power of the user equipment UE in an $i^{th}$ subframe; $P_{SRS\_OFFSET,c1}(m)$ is the transmit power adjustment value for the SRS, where m equals 0 or 1; $M_{SRS,c1}$ is the transmission bandwidth for the SRS; $P_{O\_SRS,c1}(j)$ is the target power parameter value for the SRS, where j equals 0, 1, or 2; $\alpha_{SRS,c1}(j)$ is the path loss compensation factor; and $PL_{SRS,c1}$ is the estimated downlink path loss value.

Optionally, the processor 401 is further configured to determine whether the SRS is configured periodically or configured aperiodically.

Optionally, if the power control parameter for the SRS includes the closed-loop power control parameter value for the SRS, the closed-loop power control parameter value for the SRS is an absolute value or a relative adjustment value.

Optionally, the processor 401 is further configured to obtain transmission power control TPC information, where the TPC information is information scrambled with the first radio network temporary identifier RNTI.

Optionally, the processor 401 is further configured to parse out the closed-loop power control parameter value for the SRS from the TPC information based on the first RNTI.

Optionally, if the power control parameter for the SRS includes the closed-loop power control parameter value for the SRS, the processor 401 is further configured to obtain downlink control information DCI.

Optionally, that the processor 401 obtains the power control parameter for the SRS includes that the processor 401 obtains the closed-loop power control parameter value for the SRS based on the DCI.

Optionally, if the DCI is control information obtained on a second carrier, the DCI includes at least a first carrier index.

Optionally, the second carrier is a switching-from carrier or any carrier other than a switched-to carrier, and the first carrier is the switched-to carrier.

Optionally, that the processor 401 obtains the closed-loop power control parameter value for the SRS based on the DCI includes that the processor 401 obtains the closed-loop power control parameter value for the SRS on a carrier corresponding to the first carrier index.

Optionally, if the DCI is control information obtained on the first carrier, that the processor 401 obtains the closed-loop power control parameter value for the SRS based on the DCI includes that the processor 401 obtains the closed-loop power control parameter value for the SRS from the DCI.

Optionally, if the closed-loop power control parameter value for the SRS is a relative adjustment value, the processor 401 is further configured to determine the closed-loop power control parameter value for the SRS based on at least one of closed-loop power control information or a relative adjustment value for an SRS in a previous subframe.

Optionally, that the processor 401 determines the closed-loop power control parameter for the SRS based on at least one of closed-loop power control information or a relative adjustment value for an SRS in a previous subframe includes that the processor 401 calculates the closed-loop power control parameter value $f_{SRS,c1}(i)$ for the SRS according to a formula $f_{SRS,c1}(i)=f_{SRS,c1}(i-1)+\delta_{SRS,c1}(i-K_{SRS})$, where $f_{SRS,c1}(i-1)$ is the closed-loop power control information for the SRS in the previous subframe; $\delta_{SRS,c1}(i-K_{SRS})$ is the relative adjustment value; and if the SRS is configured periodically, $K_{SRS}$ is a subframe periodicity of the SRS, or if the SRS is configured aperiodically, $i-K_{SRS}$ is a subframe number of the previous subframe.

Optionally, that the processor 401 determines transmit power for the SRS based on the power control parameter for the SRS includes that the processor 401 obtains the transmit power for the SRS based on at least one of maximum transmit power of the user equipment UE, a transmit power adjustment value for the SRS, transmission bandwidth for the SRS, the target power parameter value for the SRS, the path loss compensation factor, the estimated downlink path loss value, and a closed-loop power control parameter for the SRS.

Optionally, that the processor 401 determines transmit power for the SRS based on the power control parameter for the SRS includes that the processor 401 calculates the transmit power $P_{SRS,c1}(i)$ for the SRS according to a formula $P_{SRS,c1}(i)=\min\{P_{CMAX,c1}(i), P_{SRS\_OFFSET,c1}(m)+10 \log_{10}(M_{SRS,c1})+P_{O\_SRS,c1}(j)+\alpha_{SRS,c1}(j)\cdot PL_{SRS,c1}+f_{SRS,c1}(i)\}$, where $P_{CMAX,c1}(i)$ is maximum transmit power of the user equipment UE in an $i^{th}$ subframe; $P_{SRS\_OFFSET,c1}(m)$ is the transmit power adjustment value for the SRS, where m equals 0 or 1; $M_{SRS,c1}$ is the transmission bandwidth for the SRS; $P_{O\_SRS,c1}(j)$ is the target power parameter value for the SRS; $\alpha_{SRS,c1}(j)$ is the path loss compensation factor; $PL_{SRS,c1}$ is the estimated downlink path loss value; and $f_{SRS,c1}(i)$ is the closed-loop power control parameter value for the SRS.

The UE in this embodiment may be configured to execute the technical solution of the method embodiment shown in FIG. 2 or FIG. 3. Their implementation principles and technical effects are similar, and no more details are provided herein.

An embodiment of this application further provides UE, where a structure of the UE is the same as a structure of the UE shown in FIG. 9. When the UE runs, a processor communicates with a memory, and the processor calls an executable instruction in the memory to perform the following operations: obtaining transmit power in a symbol overlapping portion of a first subframe and a second subframe, where the first subframe is a subframe in which a sounding reference signal SRS is transmitted on a first carrier, and the second subframe is a subframe in which an SRS or a physical channel is transmitted on a second carrier; and if the transmit power is greater than maximum transmit power of the UE, controlling transmit power for a to-be-transmitted signal, where the to-be-transmitted signal includes the SRS and/or the physical channel.

Optionally, the processor is further configured to determine whether the SRS is configured periodically or configured aperiodically.

Optionally, that the processor controls transmit power for a to-be-transmitted signal includes that the processor controls the transmit power for the to-be-transmitted signal based on a periodical configuration of the SRS; or that the processor controls the transmit power for the to-be-transmitted signal based on an aperiodical configuration of the SRS.

Optionally, if the SRS is configured periodically, that the processor controls transmit power for a to-be-transmitted signal includes that dropping the SRS or performing power scaling for the SRS.

Optionally, if the SRS is configured aperiodically, the physical channel is a physical uplink shared channel PUSCH, and the PUSCH does not include uplink control information UCI, that the processor controls transmit power for a to-be-transmitted signal includes that the processor drops the PUSCH or performs power scaling for the PUSCH.

Optionally, if the SRS is configured aperiodically, the physical channel is a physical uplink shared channel PUSCH, and the PUSCH includes uplink control information UCI, that the processor controls transmit power for a to-be-transmitted signal includes that the processor drops the SRS or performs power scaling for the SRS.

Optionally, if the SRS is configured aperiodically, and the physical channel is a physical uplink control channel PUCCH, that the processor controls transmit power for a to-be-transmitted signal includes that the processor drops the SRS or performs power scaling for the SRS; or that the processor drops the PUCCH or performs power scaling for the PUCCH.

Optionally, if the SRS is configured aperiodically, the physical channel is a physical uplink control channel PUCCH, and the PUCCH includes a hybrid automatic repeat request HARQ, that the processor controls transmit power for a to-be-transmitted signal includes that the processor drops the SRS or performs power scaling for the SRS.

Optionally, if the SRS is configured aperiodically, the physical channel is a physical uplink control channel PUCCH, and the PUCCH includes only channel state information CSI, that the processor controls transmit power for a to-be-transmitted signal includes that the processor drops the SRS or performs power scaling for the SRS; or that the processor drops the PUCCH or performs power scaling for the PUCCH.

Optionally, if the SRS is configured aperiodically, the physical channel is a packet random access channel PRACH, and the PRACH is concurrent, that the processor controls transmit power for a to-be-transmitted signal includes that the processor drops the SRS or performs power scaling for the SRS.

The UE in this embodiment may be configured to execute the technical solution of the method embodiment shown in FIG. 4. Their implementation principles and technical effects are similar, and no more details are provided herein.

Figure 10:
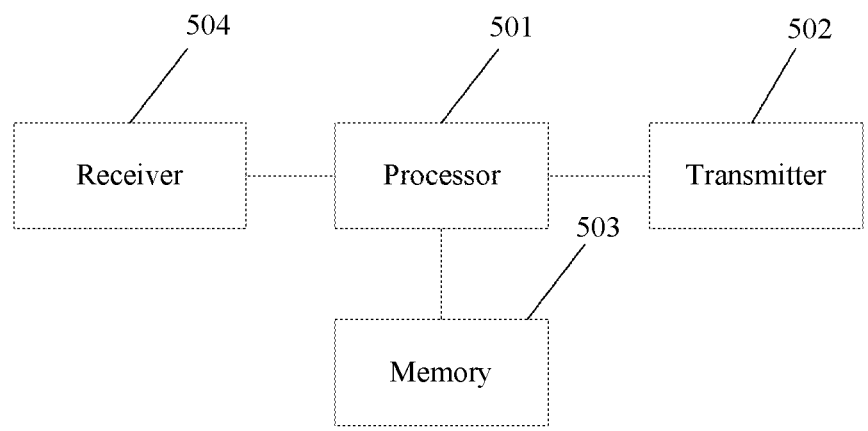
FIG. 10 is a structural diagram of a base station according to Embodiment 9 of the present disclosure.

FIG. 10 is a structural diagram of a base station according to Embodiment 9 of the present disclosure. As shown in FIG. 10, the base station includes a processor 501 and a transmitter 502. The processor 501 is configured to obtain a power control parameter for a sounding reference signal SRS on a first carrier, where the power control parameter for the SRS includes at least one of a target power parameter value for the SRS, a path loss compensation factor, and a closed-loop power control parameter value for the SRS. The transmitter 502 is configured to send the power control parameter for the SRS to user equipment UE, so that the UE determines transmit power for the SRS on the first carrier based on the power control parameter for the SRS.

Optionally, the first carrier is a carrier on which no physical uplink shared channel PUSCH is sent.

Optionally, that the transmitter 502 sends the power control parameter for the SRS to user equipment UE includes that the transmitter 502 sends the power control parameter for the SRS to the UE by using power control signaling or cross-carrier power control signaling.

Optionally, the power control signaling includes open-loop power control signaling and/or closed-loop power control signaling.

Optionally, the power control signaling or the cross-carrier power control signaling includes radio resource control RRC signaling or physical layer signaling.

Optionally, the target power parameter value for the SRS is a parameter value obtained based on a preamble initial received target power value; or the target power parameter value for the SRS is a parameter value obtained based on a preamble initial received target power value and a power adjustment value.

Optionally, that the transmitter 502 sends the power control parameter for the SRS to the UE by using power control signaling or cross-carrier power control signaling includes that the transmitter 502 scrambles the power control parameter for the SRS based on an RNTI, to generate the power control signaling or the cross-carrier power control signaling; and sending the power control signaling or the cross-carrier power control signaling to the UE.

Optionally, the SRS is configured periodically or configured aperiodically.

Optionally, if the power control parameter for the SRS includes the closed-loop power control parameter value for the SRS, the closed-loop power control parameter value for the SRS is an absolute value or a relative adjustment value.

Optionally, the transmitter 502 is further configured to send transmission power control TPC information to the UE, so that the UE parses out the closed-loop power control parameter value for the SRS from the TPC information, where the TPC information is information scrambled with the first radio network temporary identifier RNTI.

Optionally, if the power control parameter for the SRS includes the closed-loop power control parameter for the SRS, the transmitter 502 is further configured to send downlink control information DCI to the UE, so that the UE obtains the closed-loop power control parameter value for the SRS based on the DCI.

Optionally, if the DCI is control information obtained on a second carrier, the DCI includes at least a first carrier index, and the DCI is used to instruct the UE to obtain the closed-loop power control parameter value for the SRS on a carrier corresponding to the first carrier index.

Optionally, the second carrier is a switching-from carrier or any carrier other than a switched-to carrier, and the first carrier is the switched-to carrier.

Optionally, if the DCI is control information obtained on the first carrier, the DCI is used to instruct the UE to obtain the closed-loop power control parameter value for the SRS from the DCI.

Optionally, as shown in FIG. 10, the base station may further include a memory 503 and a receiver 504. The memory 503 is configured to store an instruction and data, and the receiver 504 is configured to receive data or information.

The apparatus in this embodiment may be configured to execute the technical solution of the method embodiment shown in FIG. 5. Their implementation principles and technical effects are similar, and no more details are provided herein.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a read-only memory (Read-Only Memory, ROM for short), a random access memory (random access memory, RAM for short), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A power control method, comprising:
    obtaining a power control parameter for a sounding reference signal (SRS), wherein the power control parameter for the SRS comprises at least one of a target power parameter value for the SRS, a path loss compensation factor, and a closed-loop power control parameter value for the SRS; and
    determining transmit power for the SRS on a first carrier based on the power control parameter for the SRS; wherein the first carrier is a carrier on which no physical uplink shared channel (PUSCH) is sent, wherein if the power control parameter for the SRS comprises the closed-loop power control parameter value for the SRS, before the obtaining the power control parameter for the SRS, the method further comprises obtaining downlink control information (DCI), the obtaining the power control parameter for the SRS further comprises obtaining the closed-loop power control parameter value for the SRS based on the DCI, and the obtaining the closed-loop power control parameter value for the SRS based on the DCI further comprises obtaining the closed-loop power control parameter value for the SRS on a carrier corresponding to the first carrier index.

2. The method according to claim 1, wherein the first carrier is a switched-to carrier after SRS-based carrier switching.

3. The method according to claim 1, wherein before the obtaining the power control parameter for the SRS, the method further comprises:
    obtaining transmission power control (TPC) information, wherein the TPC information is information scrambled with a first radio network temporary identifier (RNTI), wherein the obtaining the power control parameter for the SRS comprises: parsing out the closed-loop power control parameter value for the SRS from the TPC information based on the first RNTI.

4. The method according to claim 3, wherein the first RNTI is used to scramble or mask the power control parameter for the SRS, and the scrambled parameter is carried in the physical layer signaling for indication to the UE.

5. The method according to claim 1, wherein the obtaining a power control parameter for a sounding reference signal SRS comprises:
    receiving power control signalling or cross-carrier power control signalling sent by a base station.

6. The method according to claim 1, wherein before the determining transmit power for the SRS based on the power control parameter for the SRS, the method further comprises:
    determining whether the SRS is configured periodically or configured aperiodically.

7. A power control method, wherein the method comprises:
    obtaining a power control parameter for a sounding reference signal (SRS) on a first carrier, wherein the power control parameter for the SRS comprises at least one of a target power parameter value for the SRS, a path loss compensation factor, and a closed-loop power control parameter value for the SRS; and
    sending the power control parameter for the SRS to user equipment (UE), so that the UE determines transmit power for the SRS on the first carrier based on the power control parameter for the SRS; wherein the first carrier is a carrier on which no physical uplink shared channel (PUSCH) is sent; and if the power control parameter for the SRS comprises the closed-loop power control parameter for the SRS, the method further comprises:
    sending downlink control information (DCI) to the UE, so that the UE obtains the closed-loop power control parameter value for the SRS based on the DCI;
    and the DCI is used to instruct the UE to obtain the closed-loop power control parameter value for the SRS on a carrier corresponding to the first carrier index.

8. The method according to claim 7, wherein the sending the power control parameter for the SRS to user equipment UE comprises:
    scrambling the power control parameter for the SRS based on a first radio network temporary identifier (RNTI) to generate the power control signaling or the cross-carrier power control signaling; and
    sending the power control signalling or the cross-carrier power control signalling to the UE.

9. The method according to claim 8, wherein the first RNTI is used to scramble or mask the power control parameter for the SRS, and the scrambled parameter is carried in the physical layer signaling for indication to the UE.

10. The method according to claim 7, wherein the SRS is configured periodically or configured aperiodically.

11. The method according to claim 7, wherein the method further comprises:
    sending transmission power control TPC information to the UE, so that the UE parses out the closed-loop power control parameter value for the SRS from the TPC information, wherein the TPC information is information scrambled with the first RNTI.

12. A power control apparatus, comprising:
    an obtain module, configured to obtain a power control parameter for a sounding reference signal SRS, wherein the power control parameter for the SRS comprises at least one of a target power parameter value for the SRS, a path loss compensation factor, and a closed-loop power control parameter value for the SRS; and
    a determine module, configured to determine transmit power for the SRS on a first carrier based on the power control parameter for the SRS, wherein the first carrier is a carrier on which no physical uplink shared channel PUSCH is sent, the obtain module is further configured to obtain downlink control information DCI, the obtain module obtains the closed-loop power control parameter value for the SRS based on the DCI, and the DCI comprises at least a first carrier index.

13. The apparatus according to claim 12, wherein the obtain module is further configured to obtain transmission power control (TPC) information, wherein the TPC information is information scrambled with the first radio network temporary identifier RNTI, the obtain module parses out the closed-loop power control parameter value for the SRS from the TPC information based on the first RNTI.

14. The apparatus according to claim 13, wherein the first RNTI is used to scramble or mask the power control parameter for the SRS, and the scrambled parameter is carried in the physical layer signaling for indication to the UE.

15. The apparatus according to claim 12, wherein the first carrier is a switched-to carrier after SRS-based carrier switching.

16. The apparatus according to claim 12, wherein the obtaining a power control parameter for a sounding reference signal SRS comprises:
receiving power control signalling or cross-carrier power control signalling sent by a base station.

17. A power control apparatus, comprising:
an obtaining module, configured to obtain a power control parameter for a sounding reference signal (SRS) on a first carrier, wherein the power control parameter for the SRS comprises at least one of a target power parameter value for the SRS, a path loss compensation factor, and a closed-loop power control parameter value for the SRS; and
a sending module, configured to send the power control parameter for the SRS to user equipment (UE), so that the UE determines transmit power for the SRS on the first carrier based on the power control parameter for the SRS, wherein the first carrier is a carrier on which no physical uplink shared channel (PUSCH) is sent and if the power control parameter for the SRS comprises the closed-loop power control parameter value for the SRS the sending module is further configured to send downlink control information (DCI) to the UE, so that the UE obtains the closed-loop power control parameter value for the SRS based on the DCI; and wherein if the DCI is control information obtained on a second carrier, the DCI comprises at least a first carrier index, and the DCI is used to instruct the UE to obtain the closed-loop power control parameter value for the SRS on a carrier corresponding to the first carrier index.

18. The apparatus according to claim 17, wherein that the sending module is specifically configured to:
scramble the power control parameter for the SRS based on a first radio network temporary identifier (RNTI), to generate the power control signaling or the cross-carrier power control signaling; and send the power control signaling or the cross-carrier power control signaling to the UE.

19. The apparatus according to claim 18, wherein the SRS is configured periodically or configured aperiodically.

20. The apparatus according to claim 18, wherein the first RNTI is used to scramble or mask the power control parameter for the SRS, and the scrambled parameter is carried in the physical layer signaling for indication to the UE.

21. The apparatus according to claim 17, wherein the sending module is further configured to:
send transmission power control (TPC) information to the UE, so that the UE parses out the closed-loop power control parameter value for the SRS from the TPC information, wherein the TPC information is information scrambled with the first RNTI.

* * * * *